US012122064B1

(12) United States Patent
Wollenburg

(10) Patent No.: US 12,122,064 B1
(45) Date of Patent: Oct. 22, 2024

(54) METHOD AND APPARATUS FOR FLATTENING BOARDS

(71) Applicant: Woodpeckers, LLC, Strongsville, OH (US)

(72) Inventor: Benjamin T. Wollenburg, North Olmstead, OH (US)

(73) Assignee: Woodpeckers, LLC, Strongsville, OH (US)

( * ) Notice: Subject to any disclaimer, the term of this patent is extended or adjusted under 35 U.S.C. 154(b) by 0 days.

(21) Appl. No.: 18/412,802

(22) Filed: Jan. 15, 2024

(51) Int. Cl.
*B27C 5/10* (2006.01)
*B27C 1/02* (2006.01)
*B27C 1/14* (2006.01)

(52) U.S. Cl.
CPC .................. *B27C 1/02* (2013.01); *B27C 1/14* (2013.01); *B27C 5/10* (2013.01)

(58) Field of Classification Search
CPC .... B27C 1/02; B27C 1/14; B27C 5/02; B27C 5/06; B27F 1/00; B27F 1/02; B27F 1/04; B27F 1/08; B27F 1/14; B27F 1/16; B27F 5/00; B27F 5/02; B27F 5/10; B23Q 9/0007; B23Q 9/0014; B23Q 9/0021; B23Q 9/0028; B23Q 9/0035; B23Q 9/0042; B23Q 9/0057; B23Q 9/0064; B23Q 9/0071; B23Q 9/0078; B23Q 9/0092; B23Q 9/02
See application file for complete search history.

(56) References Cited

U.S. PATENT DOCUMENTS

| | | | | | |
|---|---|---|---|---|---|
| 4,966,507 | A * | 10/1990 | Hanks | B23Q 9/0078 | 144/144.1 |
| 5,533,556 | A * | 7/1996 | Whitney | B23Q 9/0042 | 144/144.1 |
| 6,138,726 | A * | 10/2000 | Newman | B23Q 9/0028 | 144/144.1 |
| 6,182,371 | B1 * | 2/2001 | Newman | B23Q 9/0042 | 144/144.1 |
| 6,363,982 | B1 * | 4/2002 | Nixon, Jr. | B27F 1/00 | 144/144.1 |
| 7,748,420 | B2 * | 7/2010 | Young | B23Q 3/069 | 33/481 |
| 10,646,932 | B2 * | 5/2020 | Setchell | B27F 1/08 | |

* cited by examiner

*Primary Examiner* — Matthew Katcoff
(74) *Attorney, Agent, or Firm* — Sand, Sebolt & Wernow Co., LPA

(57) ABSTRACT

A portable board mill that includes a sled, at least one ski, and at least one alignment guide. The sled may include a first end, a second end opposite to the first end, and a longitudinal axis defined between the first end and the second end, wherein the sled is adapted to engage with a router. The at least one ski also is also selectively operably engagable with the sled at one of the first end and the second end, wherein the at least one ski is adapted to engage with a work surface. The at least one alignment guide also operably engages with the sled and is moveable between the first end and the second end.

12 Claims, 23 Drawing Sheets

METHOD AND APPARATUS FOR FLATTENING BOARDS

TECHNICAL FIELD

This disclosure is directed to a portable board milling jig to be used with a portable router for flattening a workpiece in a controlled direction.

BACKGROUND ART

Portable routers are versatile tools that are used in multiple projects for cutting different types of workpiece, including various types of wood workpiece. In one specific instance, portable routers may be commonly used in woodworking projects for cutting flat or planar surfaces into various types of workpiece that have uneven or rough surfaces. While woodworkers may use portable routers to cut flat or planar surfaces into various types of workpiece that have uneven or rough surfaces, such operations are difficult and dangerous when operating these portable routers.

To address these difficulties and problems, woodworkers may select a device or multiple devices to help stabilize and guide the portable router during a cutting operation. While such assisting devices are provided in the market, woodworkers may have to use a number of different devices to cut continuous flat and planar surfaces along various types of workpiece. For example, woodworkers may have to use a set of first assistance devices with the portable router to cut a first flat or planar surface along a first workpiece that has a set of first dimensions and then use a set of second assistance devices with the portable router to cut a second flat or planar surface along a second workpiece that has a set of second dimensions. Such use of multiple assisting devices requires woodworkers to have access to various assisting devices and requires the expenditure of more time and effort when these woodworkers are cutting flat or planar surfaces into various types of workpiece.

SUMMARY OF THE INVENTION

The presently disclosed board mill provides a woodworker with a multifunctional tool or jig that may be used for adjusting and aligning a portable router to cut a flat or planar surface along a workpiece at a desired depth. The disclosed board mill may also reduce the overall number of portable router assisting devices that a woodworker has to use to complete a project and may also reduce the project's completion time since the need to switch between multiple devices is avoided. As such, the board mill disclosed herein addresses some of the inadequacies of previously known router assisting devices.

In one aspect, an exemplary embodiment of the present disclosure may provide a portable board mill. The portable board mill includes a sled having a first end, a second end opposite to the first end, and a longitudinal axis defined between the first end and the second end, wherein the sled is adapted to engage with a router. The portable mill also includes at least one ski that is selectively operably engagable with the sled at one of the first end and the second end, wherein the at least one ski is adapted to engage with a work surface. The portable board mill also includes at least one alignment guide operably engaged with the sled and moveable between the first end and the second end.

This exemplary embodiment or another exemplary may further include a fence assembly operably engaged with the sled at one of the first end of the sled and the second end of the sled; wherein the fence assembly is adapted to engage with an outermost end of a workpiece. This exemplary embodiment or another exemplary may further include that the sled further comprises: a first surface extending between the first end and the second end; a second surface extending between the first end and the second end and is opposite to the first surface; and a channel defined between the first end of the sled and the second end of the sled; wherein the first surface and the second surface are in operative communication with one another at the channel so that a portion of a router bit of the router is received inside of the channel; wherein the at least one alignment guide is moveable along the first surface relative to the channel. This exemplary embodiment or another exemplary may further include at least one mount of the sled positioned at one of the first end and the second end; and a set of slits defined in the at least one ski; wherein the at least one mount operably engages with the at least one ski inside a selected slit of the set of slits. This exemplary embodiment or another exemplary may further include that the at least one ski further comprises: a top end; a bottom end opposite to the top end; a first slit of the set of slits defined in the at least one ski at a first distance from the bottom end; and a second slit of the set of slits defined in the at least one ski at a second distance from the bottom end that is greater than the first distance; wherein the at least one mount operably engages with the at least one ski inside the first slit of the set of slits or the second slit of the set of slits. This exemplary embodiment or another exemplary may further include a set of openings defined in the at least one ski; and at least one attachment assembly releasably engaging the at least one ski with the sled at a selected opening of the set of openings. This exemplary embodiment or another exemplary may further include that the fence assembly comprises: a mounting bracket operably engaged with the sled; and a sacrificial fence operably engaged with the mounting bracket and positioned below the sled; wherein the sacrificial fence engages with the outermost end of the workpiece. This exemplary embodiment or another exemplary may further include that the sled further comprises: a first side defined between the first end and the second end; a second side defined between the first end and the second end and opposite to the first side; and a set of attachment through-holes defined in one of the first side and the second side; wherein the fence assembly is engageable with at least one attachment through-hole of the set of attachment through-holes. This exemplary embodiment or another exemplary may further include that the sled further comprises: a first attachment through-hole of the set attachment through-holes defined in the sled at a first distance from the first end; and a second attachment through-hole of the set attachment through-holes defined in the sled at a second distance from the first end that is greater than the first distance. This exemplary embodiment or another exemplary may further include that the fence assembly further comprises: a securement assembly operably engaging the mounting bracket with the sled at an attachment through-hole of the set of attachment through-holes. This exemplary embodiment or another exemplary may further include an attachment aperture defined by the sled; a slot defined in the at least one alignment guide; and a securement assembly operably engaging the at least one alignment guide with the sled at the attachment aperture; wherein the at least one alignment guide is moveable between the first end of the sled and the channel along the securement assembly relative to the attachment aperture. This exemplary embodiment or another exemplary may further include a first attachment aperture defined by the sled at a first distance from the channel; a second attachment aperture defined by the sled at a second distance from the channel, wherein the second distance is less than the first distance; a slot defined in the at one alignment guide; and a securement assembly operably engaging the at least one alignment guide with the sled at the first attachment aperture or the second attachment aperture; wherein the at least one alignment guide is moveable between the first end of the sled and the channel along the securement assembly relative to the first attachment aperture or the second attachment aperture. This exemplary embodiment or another exemplary may further include at least another alignment guide operably engaged with the sled and moveable between the first end and the second end; wherein the at least another alignment guide is positioned opposite to the at least one alignment guide and is moveable relative to the channel.

In another aspect, and exemplary embodiment of the present disclosure may provide a method of milling a surface of a workpiece. The method includes steps of: introducing a sled of a portable board mill to the workpiece; engaging at least one ski of the portable board mill with the sled, wherein the sled is spaced apart from the workpiece by the at least one ski at a desired height; resting a router on the sled; adjusting at least one alignment guide of the portable board mill until the at least one alignment guide abuts the router; guiding the router along the sled and the workpiece by the at least one alignment guide; and milling the surface of the workpiece.

This exemplary embodiment or another exemplary embodiment may further include steps of engaging a fence assembly of the portable board mill with the sled; engaging an outermost end of the workpiece with the fence assembly; and guiding the portable board mill along the outermost end of the workpiece by the fence assembly. This exemplary embodiment or another exemplary embodiment may further include that the step of engaging the at least one ski of the portable board mill with the sled further comprises: selecting a slit from at least one set of slits defined in the at least one ski; engaging a mount of the sled with the at least one ski at the selected slit of the at least one ski; and maintaining the sled at the desired height, by the at least one ski, above the workpiece. This exemplary embodiment or another exemplary embodiment may further include that the step of adjusting the at least one alignment guide of the portable board mill further comprises: selecting between a first attachment aperture defined in the sled and a second attachment aperture defined in the sled; and engaging the at least one alignment guide with the sled, by a securement assembly, at the first attachment aperture or the second attachment aperture. This exemplary embodiment or another exemplary embodiment may further include that the step of engaging the fence assembly with the sled further comprises: selecting an attachment through-hole of a set of attachment through-holes defined by the sled; engaging a mounting bracket of the fence assembly with the sled at the selected through-hole; engaging a sacrificial fence of the fence assembly to the mounting bracket; and contacting the sacrificial fence with the outermost end of the workpiece. This exemplary embodiment or another exemplary embodiment may further include that the step of engaging the at least one ski of the portable board mill with the sled further comprises: engaging at least one ski of the portable board mill with the sled, wherein the sled is spaced apart from the workpiece by the at least one ski and the at least another ski at the desired height. This exemplary embodiment or another exemplary embodiment may further include steps of engaging an alignment tool of the portable board mill with a router; and adjusting the alignment tool, by the router, until a base of the router touches a depth disc of the alignment tool.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
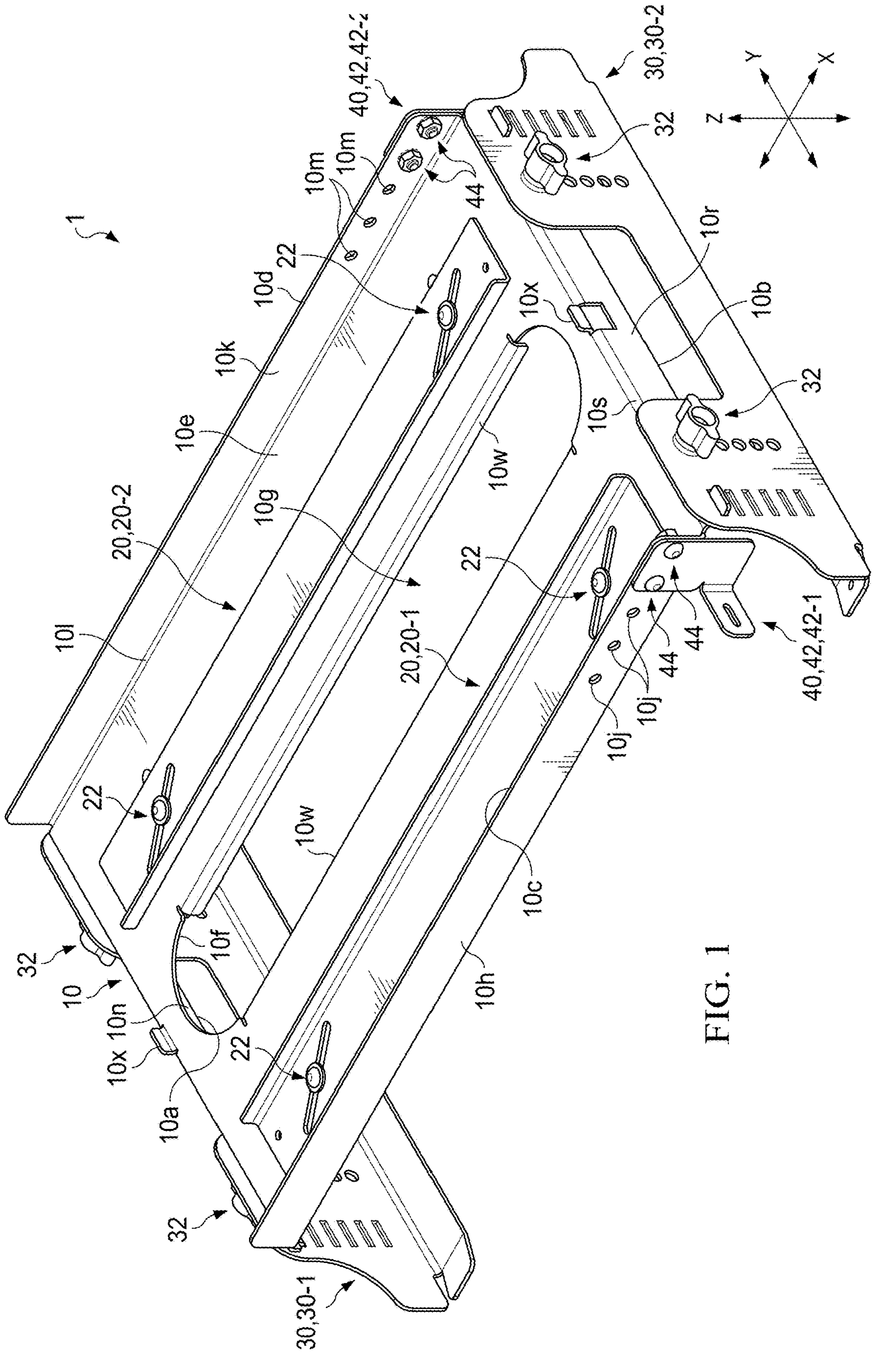
FIG. 1 is a rear, top, left side perspective view of a portable board mill jig (hereinafter "board mill jig") in accordance with one aspect of the present disclosure.

FIG. 1 illustrates a portable board mill (hereinafter "board mill") that is generally referred to as 1. As discussed in greater detail below, board mill jig 1 is configured to be placed on any suitable flat or planar work table for flattening or leveling uneven surfaces of various types of workpiece with a router. In one instance, board mill jig 1 is configurable between various heights for flattening or leveling various types of workpiece having variable thicknesses. In another instance, board mill jig 1 is also configurable to hold and guide various types of portable routers in a controlled direction when such routers are flattening or leveling uneven surfaces of various types of workpiece. In yet another instance, board mill jig 1 may also be configurable with a fence assembly so that the board mill jig 1 slides along outermost edges of various types of workpiece as well as testing the cutting heights of the router prior to cutting operations. Such components and assemblies of board mill jig 1 are now discussed in greater detail below.

It should be understood that terms "front", "rear", "left", "right", "top", "bottom", and other derivative terms of the like describing direction or position should not limit the configuration and/or orientation of the board mill jig 1 when used in operation. The component and parts that form the board mill jig 1 are described in more detail below.

Board mill jig 1 includes a sled 10. As best seen in FIG. 1, sled 10 includes a first or front end 10*a*, a second or rear end 10*b* that is longitudinally opposite to the front end 10*a*, and a longitudinal axis "X" extending between the front end 10*a* and the rear end 10*b* (see FIG. 1). Sled 10 also includes a first or left side 10*c*, a second or right side 10*d* opposite to the left side 10*c*, and a transverse axis "Y" extending between the left side 10*c* and the right side 10*d* (see FIG. 1). Sled 10 also includes a top surface 10*e* that extends between the front end 10*a* and the rear end 10*b* and between the left side 10*c* and the right side 10*d*, a bottom surface 10*f* that is opposite to the top surface 10*e* and extends between the front end 10*a* and the rear end 10*b* and between the left side 10*c* and the right side 10*d*, and a vertical axis "Z" extending between the top surface 10*e* and the bottom surface 10*f* (see FIG. 1).

Figure 5:
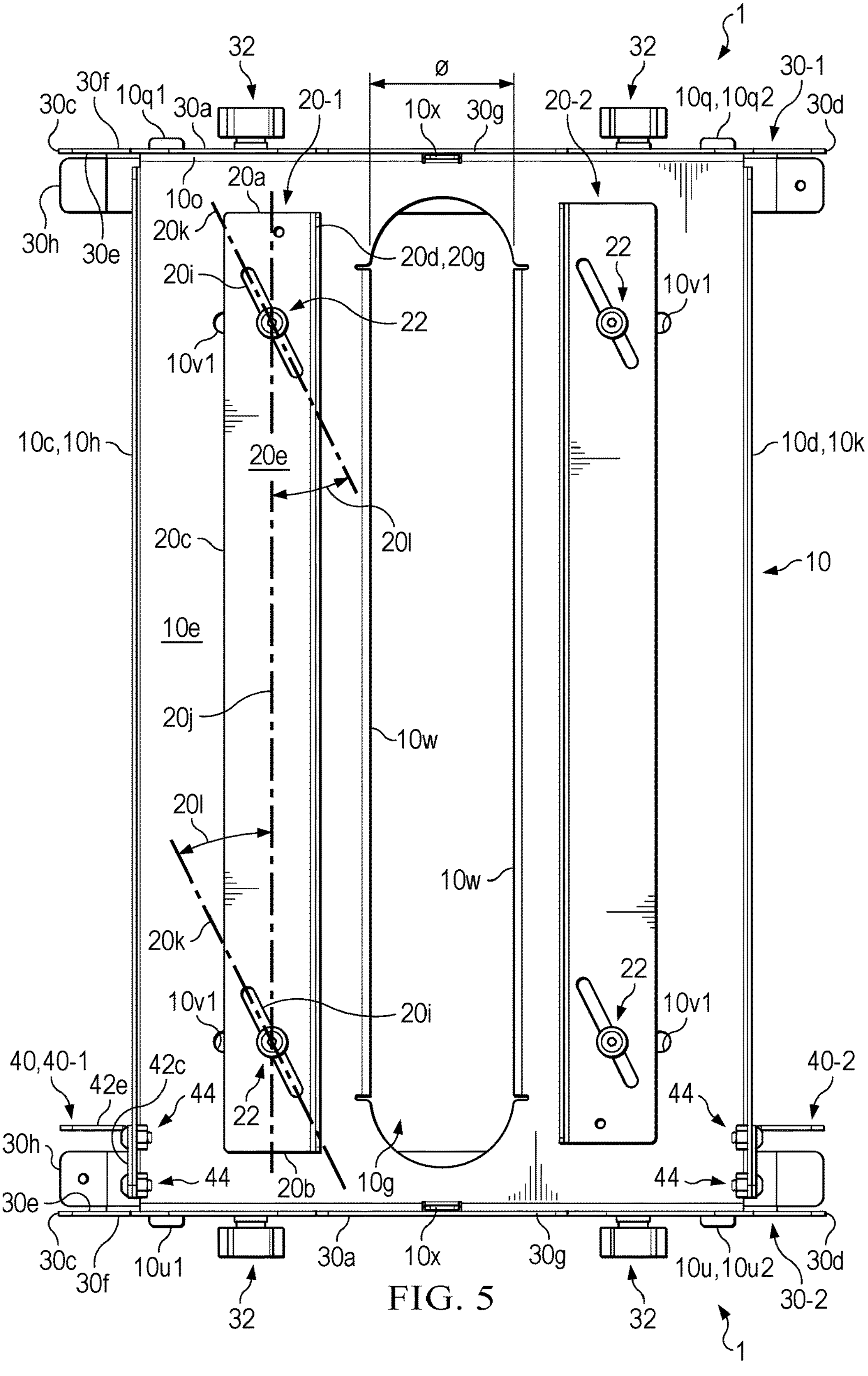
FIG. 5 is a top plan view of the board mill jig.

Sled 10 also defines a channel 10*g*. As best seen in FIG. 5, the channel 10*g* extends longitudinally between the front end 10*a* and the rear end 10*b* along the longitudinal axis "X" of sled 10. In the present disclosure, the channel 10*g* extends entirely through the sled 10 along the vertical axis "Z" of sled 10 between the top surface 10*e* and the bottom surface 10*f*; the top surface 10*e* and the bottom surface 10*f* are in operative communication with one another at the channel 10*g*. The channel 10*g* defined by sled 10 also has an oblong shape when viewed from a top plan view (see FIG. 5) with a diameter (denoted by a double arrow labeled "0" in FIG. 5). In other exemplary embodiments, sled 10 may define any suitable shape and diameter for channel 10*g* based on various considerations, including the types of cutters or router bits being used with board mill jig 1. In one exemplary embodiment, channel 10*g* is configured to receive and house cutters or router bits up to two inches in diameter without contacting or interfering with the sled 10.

Figure 9:
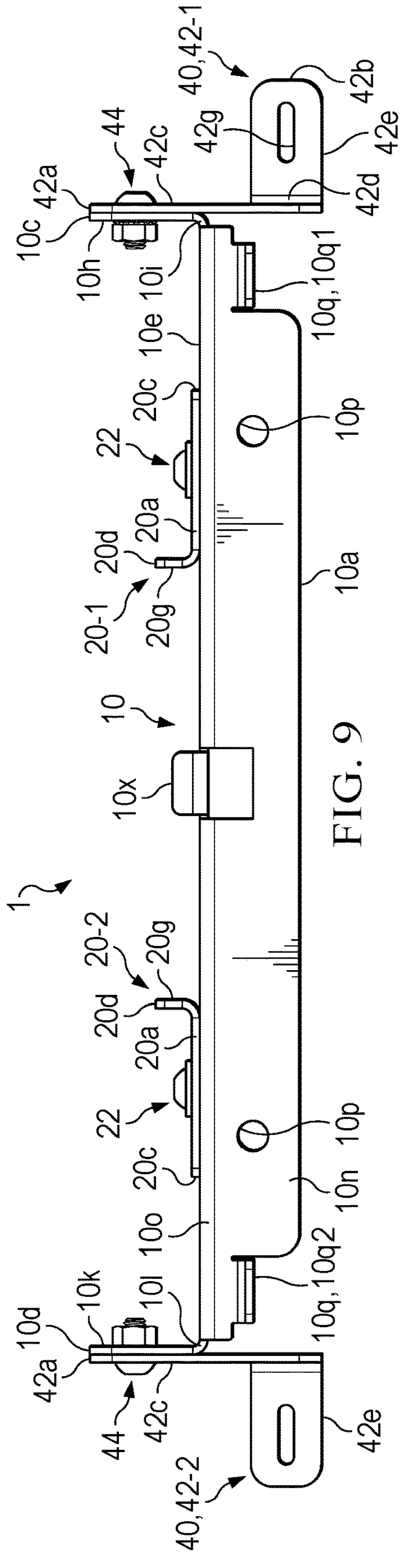
FIG. 9 is a front elevation view of the board mill jig, wherein the pair of skis are removed.
Figure 10:
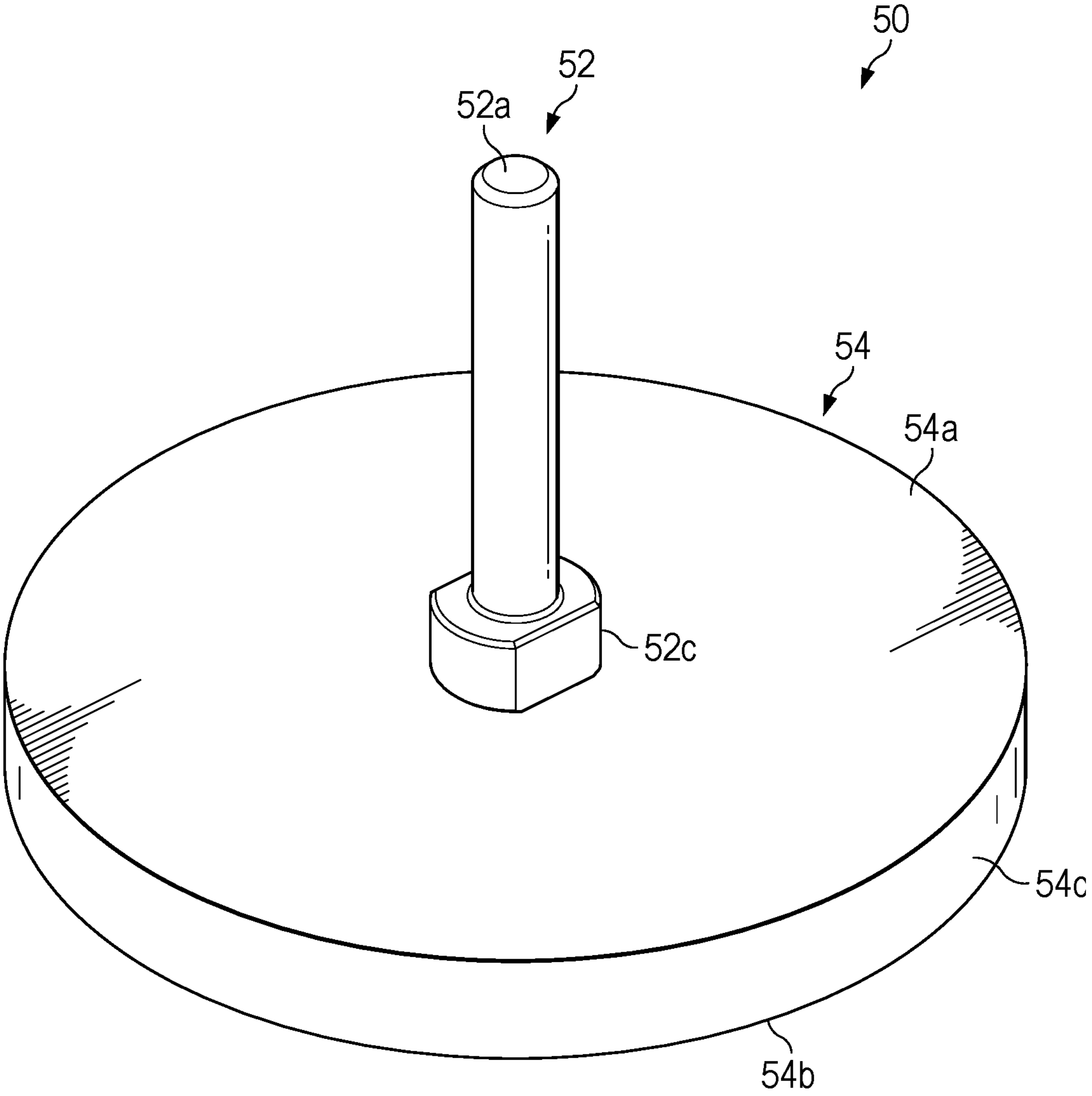
FIG. 10 is a top perspective view of an alignment tool that is used with the board mill jig.

Sled 10 also includes a first upper rail 10*h*. As best seen in FIG. 9, first upper rail 10*h* is defined between the left side 10*c* of the sled 10 and a first bend 10*i* defined in the sled 10. As such, the first upper rail 10*h* defines the left side 10*c* of the sled 10 and portions of the top surface 10*e* and the bottom surface 10*f* between the left side 10*c* and the first bend 10*i*. In this configuration, the left side 10*c* is positioned above the front end 10*a* and the rear end 10*b* relative to the vertical axis "Z" of sled 10. The first upper rail 10*h* also defines a set of first attachment through-holes 10*j* between the left side 10*c* and the first bend 10*i*. In the present disclosure, each attachment through-hole of the set of first attachment through-holes 10*j* extends entirely through the sled 10 along the traverse axis "Y" of sled 10 between the top surface 10*e* and the bottom surface 10*f*; the top surface 10*e* and the bottom surface 10*f* are in operative communication with one another at each attachment through-hole of the set of first attachment through-holes 10*j*.

Figure 4:
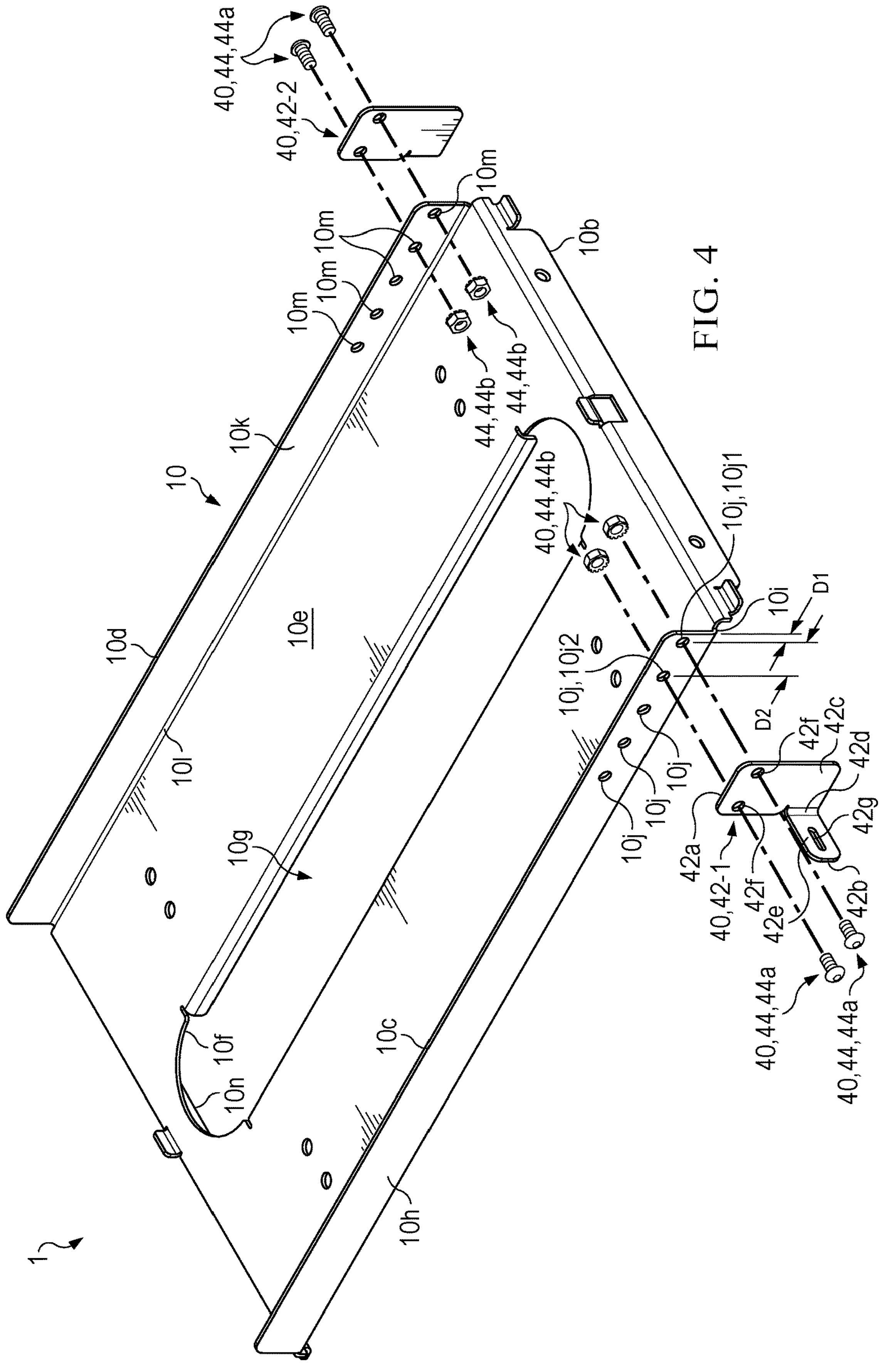
FIG. 4 is a rear, top, left side perspective view of the board mill jig, wherein a fence assembly of the board mill jig is exploded away from the sled.

In the present disclosure, each attachment through-hole of the set of first attachment through-holes 10*j* is grouped near the rear end 10*b* of sled 10. As best seen in FIG. 4, each attachment through-hole of the set of first attachment through-holes 10*j* is defined at a distance away from the rear end 10*b* of the sled 10 for attachment means, which are discussed in greater detail below. In one instance, a first attachment through-hole 10*j*1 of the set of first attachment through-holes 10*j* is measured at a first distance (arrows labeled "D1" in FIGS. 4 and 7) where the first attachment through-hole 10*j*1 is the closest attachment through-hole 10*j* to the rear end 10*b*. In this same instance, a second attachment through-hole 10*j*2 of the set of first attachment through-holes 10*j* is measured at a second distance (arrows labeled "D2" in FIGS. 4 and 7) where the first attachment through-hole 10*j*1 is the next closest attachment through-hole 10*j* to the rear end 10*b*; the second distance of the second attachment through-hole 10*j*2 is greater than the first distance of the first attachment through-hole 10*j*1. The remaining attachment through-holes of the set of first attachment through-holes 10*j* are also measured at greater distances away from the rear end 10*b* so that a fence assembly of the board mill jig 1 may be engaged with the sled 10 at a desired position based on the width of a workpiece.

Still referring to FIG. 9, sled 10 includes a second upper rail 10*k* that is defined between the right side 10*d* of the sled 10 and a second bend 10*l* defined in the sled 10. As such, the second upper rail 10*k* defines the right side 10*d* of the sled 10 and portions of the top surface 10*e* and the bottom surface 10*f* between the right side 10*d* and the second bend 10*l*. In this configuration, the right side 10*d* is positioned above the front end 10*a* and the rear end 10*b* relative to the vertical axis "Z" of sled 10. The second upper rail 10*k* also defines a set of second attachment through-holes 10*m* between the right side 10*d* and the second bend 10*l*. In the present disclosure, each attachment through-hole of the set of second attachment through-holes 10*m* extends entirely through the sled 10 along the traverse axis "Y" of sled 10 between the top surface 10*e* and the bottom surface 10*f*; the top surface 10*e* and the bottom surface 10*f* are in operative communication with one another at each attachment through-hole of the set of second attachment through-holes 10*m*.

Similar to the set of first attachment through-holes 10*j*, each attachment through-hole of the set of second attachment through-holes 10*m* are spaced apart from one another at distances relative to the rear end 10*b* of the sled 10. Based on this configuration, each attachment through-hole of the set of first attachment through-holes 10*j* is coaxial with a respective attachment through-hole of the set of second attachment through-holes 10*m* so that a sacrificial fence of a fence assembly of the board mill 1 may be engaged with the sled 10 at a desired position based on the width of a workpiece.

Figure 7:
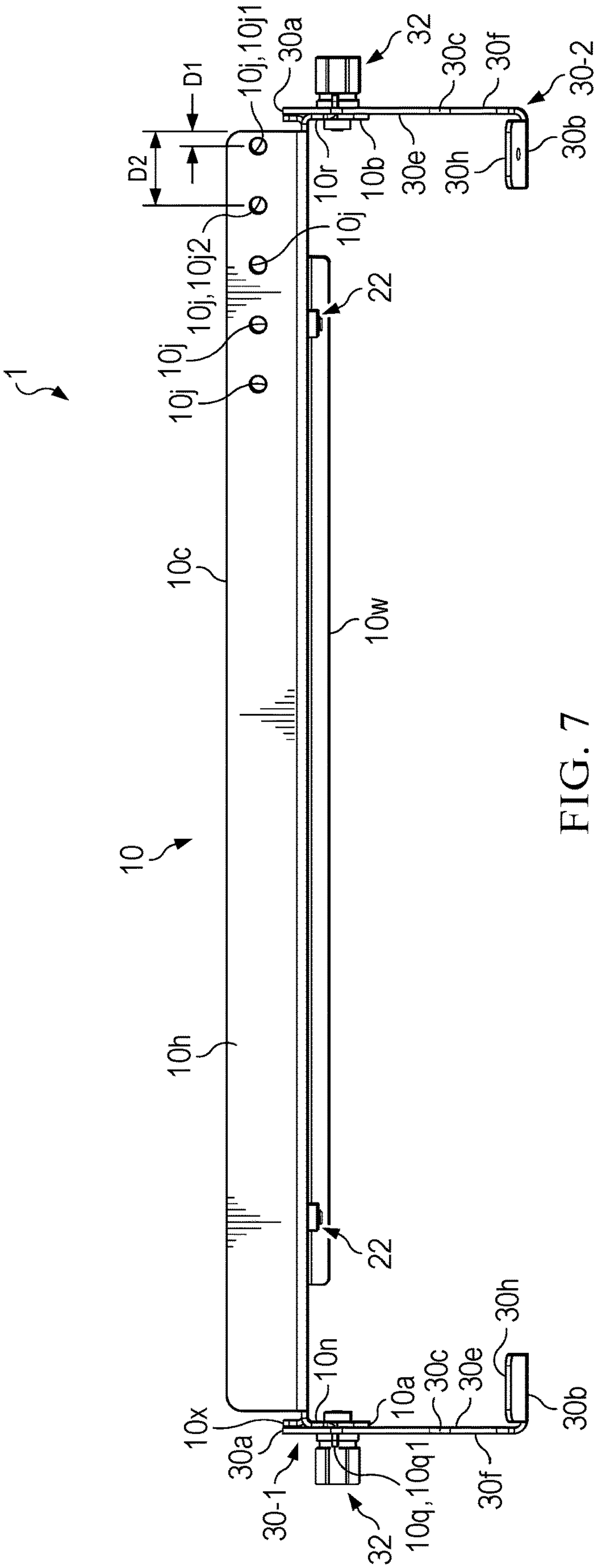
FIG. 7 is a left side elevation view of the board mill jig.

Sled 10 also includes a first lower rail 10*n*. As best seen in FIG. 7, first lower rail 10*n* is defined between the front end 10*a* of the sled 10 and a third bend 100 defined in the sled 10. As such, the first lower rail 10*n* defines the front end 10*a* of the sled 10 and portions of the top surface 10*e* and the bottom surface 10*f* between the front end 10*a* and the third bend 100. In this configuration, the front end 10*a* is positioned below the left side 10*c* and the right side 10*d* relative to the vertical axis "Z" of sled 10.

The first lower rail 10*n* also defines at least one set of securement through-holes 10*p*. In the present disclosure, and as best seen in FIG. 9, first lower rail 10*n* includes a pair of securement through-holes 10*p* in which a first securement through-hole of the pair of securement through-holes 10*p* is defined near the left side 10*c*, and a second securement through-hole of the pair of securement through-holes 10*p* is defined near the right side 10*d*. In the present disclosure, each securement through-hole of the set of first securement through-holes 10*p* extends entirely through the sled 10 along the longitudinal axis "X" of sled 10 between the top surface 10*e* and the bottom surface 10*f*; such definition of each securement through-hole of the set of first securement through-holes 10*p* allows the top surface 10*e* and the bottom surface 10*f* to be in operative communication with one another at each securement through-hole of the set of first securement through-holes 10*p*. Such use and purpose of the set of first securement through-holes 10*p* is discussed in greater detail below.

The first lower rail 10*n* also includes at least one mount or tab 10*q*. In the present disclosure, and as best seen in FIG. 9, first lower rail 10*n* includes a first pair of mounts 10*q* in which a first mount 10*q*1 is defined at the left side 10*c* of the sled 10, and a second mount 10*q*2 is defined at the right side 10*d* of the sled 10 opposite to the first mount 10*n*1. As discussed in greater detail below, one or both of the mounts 10*q*1, 10*q*2 of the first pair of mounts 10*q* is configured to engage with a ski of the board mill jig 1 to elevate and maintain the sled 10 at a desired height above a workpiece so a router may flatten or mill a desired amount of material from the workpiece at the desired height.

Referring to FIG. 7, sled 10 includes a second lower rail 10*r* that is defined between the rear end 10*b* of the sled 10 and a fourth bend 10*s* defined in the sled 10. As such, the second lower rail 10*r* defines the rear end 10*b* of the sled 10 and portions of the top surface 10*e* and the bottom surface 10*f* between the rear end 10*b* and the fourth bend 10*s*. In this configuration, the rear end 10*b* is positioned below the left side 10*c* and the right side 10*d* relative to the vertical axis "Z" of sled 10.

The second lower rail 10*r* also defines at least one set of securement through-holes 10*t*. Similar to the first lower rail 10*n*, second lower rail 10*r* includes a pair of securement through-holes 10*t* in which a first securement through-hole of the pair of securement through-holes 10*t* is defined near the left side 10*c*, and a second securement through-hole of the pair of securement through-holes 10*t* is defined near the right side 10*d* (see FIG. 3). In the present disclosure, each securement through-hole of the set of second securement through-holes 10*t* extends entirely through the sled 10 along the longitudinal axis "X" of sled 10 between the top surface 10*e* and the bottom surface 10*f*; such definition of each securement through-hole of the set of second securement through-holes 10*t* allows the top surface 10*e* and the bottom surface 10*f* to be in operative communication with one another at each securement through-hole of the set of second securement through-holes 10*t*. Such use and purpose of the set of second securement through-holes 10*t* is discussed in greater detail below.

The second lower rail 10*r* also includes at least one mount or tab 10*u*. Similar to the first lower rail 10*n*, second lower rail 10*r* includes a second pair of mounts 10*u* in which a first mount 10*u*1 is defined at the left side 10*c* of the sled 10, and a second mount 10*u*2 is defined at the right side 10*d* of the sled 10 opposite to the first mount 10*u*1 (see FIG. 3). As discussed in greater detail below, one or both of the mounts 10*u*1, 10*u*2 of the second pair of mounts 10*u* is configured to engage with another ski of the board mill jig 1 to elevate and maintain the sled 10 at a desired height above a workpiece so a router may flatten or mill a desired amount of material from the workpiece at the desired height.

Figure 2:
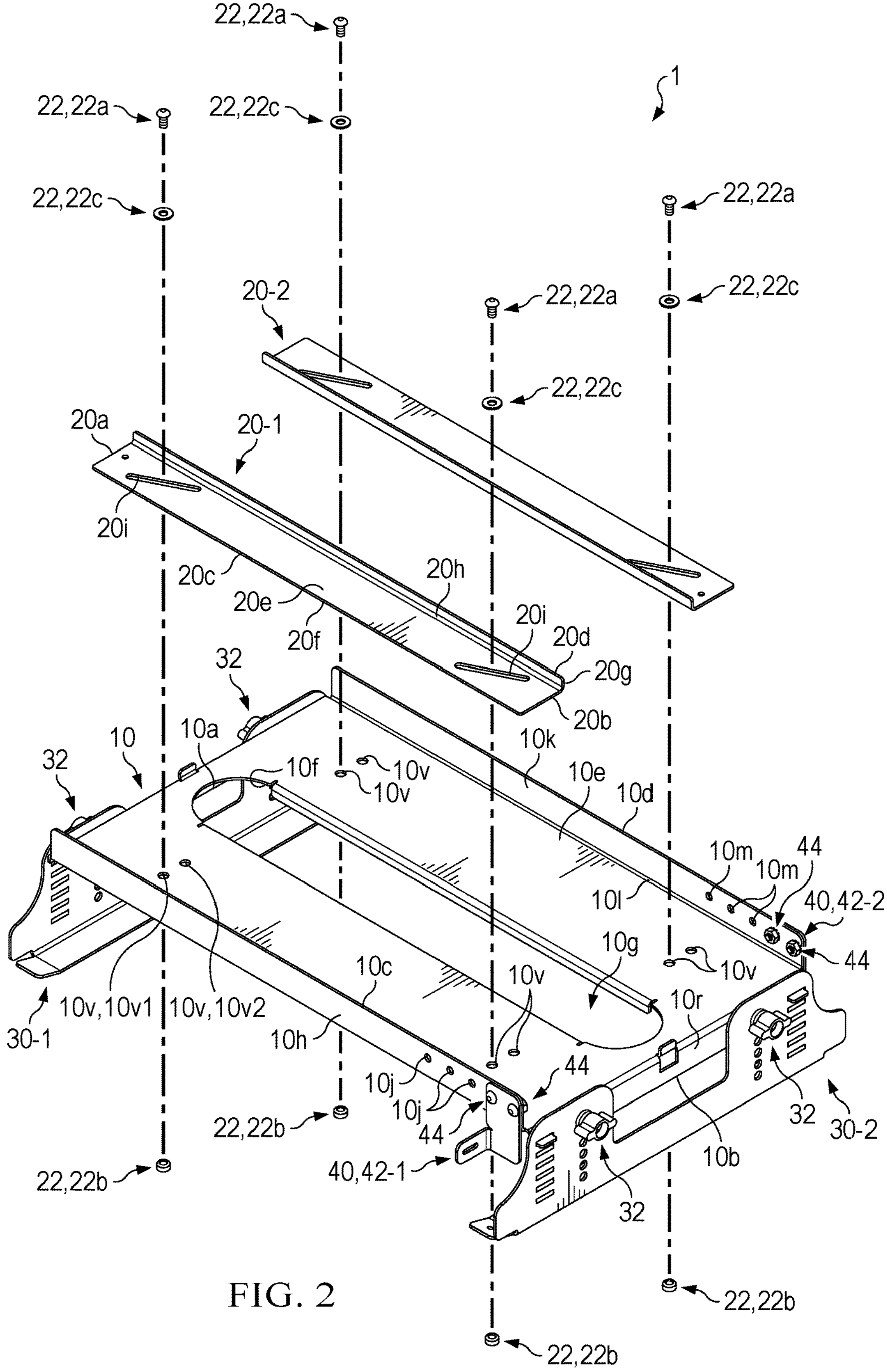
FIG. 2 is a rear, top, left side perspective view of the board mill jig, wherein a pair of alignment guides of the board mill jig is exploded away from a sled of the board mill jig.
Figure 6:
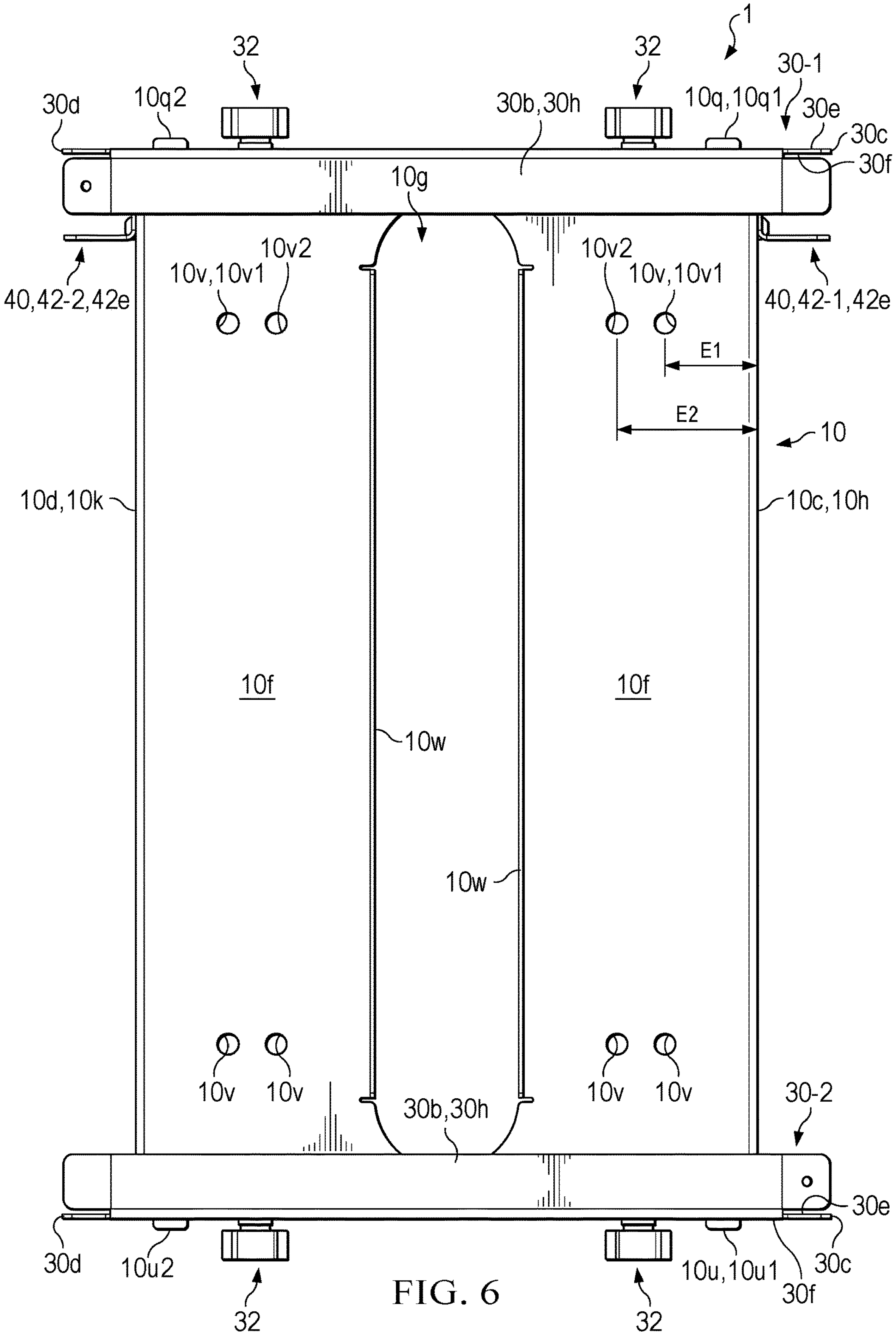
FIG. 6 is a bottom plan view of the board mill jig.

Sled 10 also defines pairs of attachment apertures 10*v*. As best seen in FIGS. 2 and 5-6, a first attachment aperture 10*v*1 of each pair of attachment apertures 10*v* is defined between one of a left side 10*c* and a right side 10*d* and the channel 10*g*. As best seen in FIG. 5, the first attachment aperture 10*v*1 of each pair of attachment apertures 10*v* is also measured at a first distance (denoted by double arrows labeled "E1" in FIG. 6) from the left side 10*c*. It should be understood that a first attachment aperture 10*v*1 of an opposing pair of attachment apertures 10*v* may also be measured at the same first distance from the right side 10*d*.

Referring to FIGS. 5 and 6, a second attachment aperture 10*v*2 of each pair of attachment apertures 10*v* is defined between the first attachment aperture 10*v*1 and the channel 10*g*. As best seen in FIG. 6, the second attachment aperture 10*v*2 of each pair of attachment apertures 10*v* is also measured at a second distance (denoted by double arrows labeled "E2" in FIG. 5) from the left side 10*c*; the second distance E2 measured between the left side 10*c* and the second attachment aperture 10*v*2 is greater than the first distance E1 of the first attachment aperture 10*v*1 that is measured between the left side 10*c* and the first attachment aperture 10*v*1. It should be understood that a second attachment aperture 10*v*2 of an opposing pair of attachment apertures 10*v* may also be measured at the same second distance from the right side 10*d*.

In the present disclosure, sled 10 defines four pairs of attachment apertures 10*v*. In this present disclosure, and as best seen in FIG. 6, two pairs of attachment apertures 10*v* are defined between the left side 10*c* and the channel 10*g*, and the remaining two pairs of attachment apertures 10*v* are defined between the right side 10*d* and the channel 10*g*. In other exemplary embodiments, sled 10 may define any suitable number of attachment apertures based on various considerations, including the number of slots defined by an alignment guide of the board mill jig 1 to attach said alignment guide with the sled 10.

Sled 10 also includes a pair of guards 10*w*. As best seen in FIGS. 5-6, a first guard of the pair of guards 10*w* is positioned proximate to the left side 10*c* and extends downwardly through the channel 10*g* such that a portion of the first guard of the pair of guards 10*w* is positioned inside of the channel 10*g*; as such, the first guard of the pair of guards 10*w* defines a portion of the channel 10*g*. Similarly, a second guard of the pair of guards 10*w* is positioned proximate to the right side 10*d*, opposite to the first guard, and extends downwardly through the channel 10*g* such that a portion of the second guard of the pair of guards 10*w* is positioned inside of the channel 10*g*; as such, the second guard of the pair of guards 10*w* also defines a portion of the channel 10*g*. In the present disclosure, each guard of the pair of guards

10w also defines portions of the top surface 10e and the bottom surface 10f. In operation, the pair of guards 10w prevent and/or limit the travel of a router so that a cutter or router bit that is equipped to the router is free from accidentally contacting and cutting into other components of the sled 10.

Sled 10 also includes a pair of stops 10x. As best seen in FIG. 5, a first stop of the pair of stops 10x is positioned at the front end 10a of the sled 10 and is spaced apart from the channel 10g. Still referring to FIG. 5, a second stop of the pair of stops 10x is positioned at the rear end 10b of the sled 10 and is spaced apart from the channel 10g. In the present disclosure, each stop of the pair of stops 10x oppose one another relative to the longitudinal axis "X" of sled 10. In operation, the pair of stops 10x may prevent longitudinal movement of a router along the board mill jig 1 once placed and secured to the board mill jig 1 by a pair of alignment guides of the board mill jig 1, which are discussed in greater detail below.

Board mill jig 1 also includes at least one alignment guide 20 that operably engages with and moves along the sled 10 between the first end 10a and the second end 10b. In particular, board mill jig 1 includes a pair of alignment guides 20-1, 20-2 that operably engages with and moves along the sled 10 wherein the first alignment guide 20-1 moves between the left side 10c and channel 10g, and the second alignment guide 20-2 moves between the right side 10d and channel 10g independently of the first alignment guide 20-1. Each alignment guide of the pair of alignment guides 20-1, 20-2 is identical to one another and is orientated at one another relative to the longitudinal axis "X" of the sled 10. For brevity, features and components of the first alignment guide 20-1 will be discussed in greater detail below. While the first alignment guide 20-1 will be discussed in greater detail below, it should be understood that the features and components of the first alignment guide 20-1 apply equally to the second alignment guide 20-2.

As best seen in FIG. 2, the first alignment guide 20-1 includes a first or front end 20a, a second or rear end 20b longitudinally opposite to the first end 20a, and a longitudinal direction extending from the first end 20a to the second end 20b. The first alignment guide 20-1 also includes a first or inner side 20c, a second or outer side 20d that is transversely opposite to the first side 20c, and a transverse direction extending between the inner side 20c and the outer side 20d. The first alignment guide 20-1 also includes a first surface 20e that is free from engaging with the sled 10, and a second surface 20f that is opposite to the first surface 20e and engages with the top surface 10e of sled 10. The first alignment guide 20-1 also includes a bumper 20g that is positioned between the inner side 20c and a bend 20h defining the bumper 20g. In the present disclosure, the bumper 20g defines the inner side 20c and includes portions of the first surface 20e and the second surface 20f between the inner side 20c and the bend 20h. Such use and purpose of bumper 20g is discussed in greater detail below.

Still referring to first alignment guide 20-1, the first alignment guide 20-1 also defines at least one slot 20i. As best seen in FIG. 2, the first alignment guide 20-1 defines a pair of slots 20i between the first end 20a and the second end 20b. Each slot of the pair of slots 20i extends entirely through the first alignment guide 20-1 between the first surface 20e and the second surface 20f. It should be noted that the first surface 20e and the second surface 20f are also in operative communication with one another at each slot of the pair of slots 20i. As discussed in greater detail below, each slot of the pair of slots 20i allows a woodworker to engage the first alignment guide 20-1 with the sled 10 and to adjust the first alignment guide 20-1 based on the size, shape, or configuration of a router being guided along the sled 10 during a cutting operation.

Still referring to the first alignment guide 20-1, the first alignment guide 20-1 also includes a central axis 20j that extends longitudinally between the first end 20a and the second end 20b (see FIG. 5). Each slot of the pair of slots 20i is also orientated at an angle relative to the central axis 20j. As best seen in FIG. 5, each slot of the pair of slots 20i is defined along a slot axis 20k that is orientated at an angle 20l measured relative to the central axis 20j of the first alignment guide 20-1.

It should be understood that angle 20l measured between the central axis 20j and the slot axis 20k of each slot of the pair of slots 20i may be any suitable angle. In one exemplary embodiment, the angle 20l defined between the central axis 20j and each slot axis 20k may be a range between 0 degrees up to 90 degrees. In another exemplary embodiment, the angle 20l defined between the central axis 20j and each slot axis 20k may be a range between 25 degrees up to 60 degrees. In the present disclosure, angle 20l measured between the central axis 20j and the slot axis 20k of each slot of the pair of slots 20i is approximately 26 degrees.

Board mill jig 1 may also include at least one securement assembly 22 that operably engages the pair of alignment guides 20-1, 20-2 with the sled 10. In the present disclosure, a pair of securement assemblies 22 operably engages each alignment guide of the pair of alignment guides 20-1, 20-2 with the sled 10. As best seen in FIGS. 2 and 5, each securement assembly 22 includes a fastener 22a that threadably engages with an associated nut 22b (see FIG. 6) for attaching each alignment guide of the pair of alignment guides 20-1, 20-2 with the sled 10. Each securement assembly 22 may also include a washer 22c that engages the fastener 22a and the bottom surface 10f of the sled 10. If desired, the washer 22c may be integral with the fastener 22a or be removed from the securement assembly 22 if desired in other exemplary embodiments.

In operation, one of both of the alignment guides of the pair of alignment guides 20-1, 20-2 may be moved along the top surface 10e of the sled 10 while be connected with the sled 10 by the pair of securement assemblies 22. Particularly, one or both fasteners 22a of the pair of securement assemblies 22 may be loosened from the associated nuts 22b to allow the selected alignment guide of the pair of alignment guides 20-1, 20-2 to move freely along the sled 10 while still be connected with the sled 10. Such movement of the pair of alignment guides 20-1, 20-2 is desired when the woodworker is setting the position of the pair of alignment guides 20-1, 20-2 with a selected router so that router is moved in a controlled direction by the pair of alignment guides 20-1, 20-2. Once set, one or both fasteners 22a of the pair of securement assemblies 22 may then be tightened with the associated nuts 22b to prevent the selected alignment guide of the pair of alignment guides 20-1, 20-2 from moving along the sled 10.

Board mill jig 1 also includes at least one ski 30 that is selectively operably engageable with the sled 10 at the first lower rail 10n or the second lower rail 10r. In the present disclosure, board mill jig 1 includes a pair of skis 30-1, 30-2 that selectively operably engages with the sled 10 wherein the first ski 30-1 selectively operably engages with the first lower rail 10n of sled 10, and the second ski 30-2 selectively operably engages with the second lower rail 10r of sled 10. Each ski of the pair of skis 30-1, 30-2 is identical to one another and is orientated at one another relative to the transverse axis "Y" of the sled 10. For brevity, features and components of the first ski 30-1 will be discussed in greater detail below. While the first ski 30-1 will be discussed in greater detail below, the features and components of the second ski 30-2 are identical to the features and components of the first ski 30-1.

Figure 3:
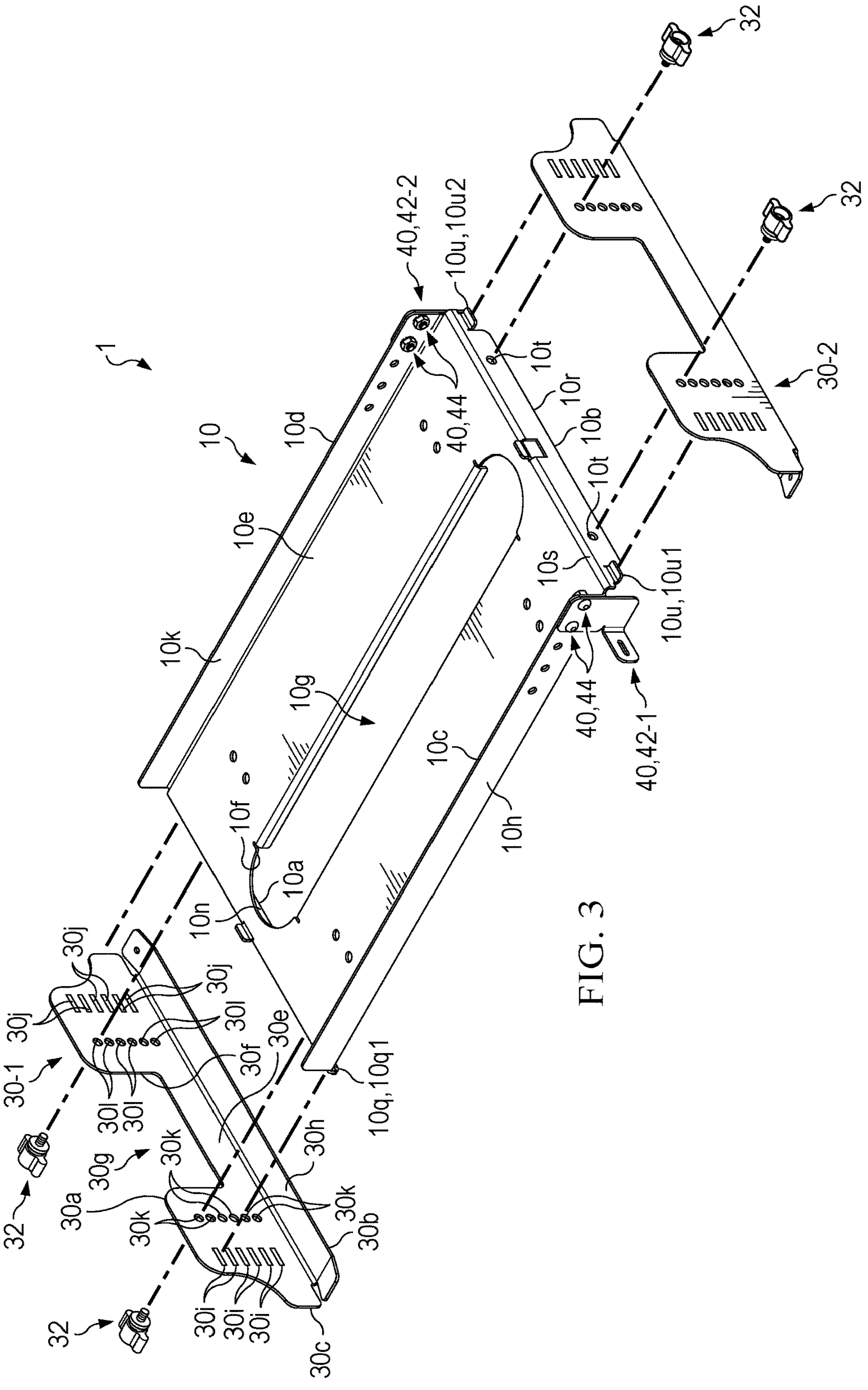
FIG. 3 is a rear, top, left side perspective view of the board mill jig, wherein a pair of skis of the board mill jig is exploded away from the sled.

As best seen in FIG. 3, the first ski 30-1 includes a top end 30*a*, a bottom end 30*b* that is vertically opposite to the top end 30*a*, and a vertical axis extending between the top end 30*a* to the bottom end 30*b*. Still referring to FIG. 3, the first ski 30-1 includes a first side 30*c*, a second side 30*d* opposite to the first side 30*c*, an inner surface 30*e* that extends between the first side 30*c* and the second side 30*d*, and an outer surface 30*f* opposite to the inner surface 30*e* and that extends between the first side 30*c* and the second side 30*d*.

Still referring to first ski 30-1, the first ski 30-1 defines a cavity 30*g* and includes a foot or skid 30*h*. As best seen in FIG. 2, the cavity 30*g* extends downwardly into the first ski 30-1 from the top end 30*a* towards the bottom end 30*b*. In the present disclosure, the cavity 30*g* defines a U-shape when viewed from a side elevation view (see FIG. 8). In operation, a woodworker may grip the first ski 30-1 inside of the cavity 30*g* and use this portion of the first ski 30-1 as a handle when engaging the first ski 30-1 with the sled 10; such engagement of the sled 10 and the first ski 30-1 is discussed in greater detail below. Still referring to FIG. 2, the skid 30*h* is defined between the bottom end 30*b* to a bend defined in the first ski 30-1. As such, the skid 30*h* includes the bottom end 30*b* and portions of the inner surface 30*e* and the outer surface 30*f* between the bottom end 30*b* and the bend. In operation, the skid 30*h* allows the woodworker to glide the board mill jig 1 along a work surface or work table.

Still referring to first ski 30-1, the first ski 30-1 also defines at least one set of slits between the top end 30*a* and the bottom end 30*b*. As best seen in FIG. 3, the first ski 30-1 defines sets of slits 30*i*, 30*j* between the top end 30*a* and the bottom end 30*b*. In the illustrated embodiment, a set of first slits 30*i* is defined proximate to the first side 30*c* of the first ski 30-1 and extends entirely through the first ski 30-1 between the inner surface 30*e* and the outer surface 30*f*. It should be noted that the inner surface 30*e* and the outer surface 30*f* of first ski 30-1 are in operative communication with one another at each slit of the set of first slits 30*i*. A set of second slits 30*j* is also defined proximate to the second side 30*d* of the first ski 30-1 and extends entirely through the first ski 30-1 between the inner surface 30*e* and the outer surface 30*f*. It should be noted that the inner surface 30*e* and the outer surface 30*f* of first ski 30-1 are in operative communication with one another at each slit of the set of second slits 30*j*.

Still referring to first ski 30-1, the first ski 30-1 also defines at least one set of openings between the top end 30*a* and the bottom end 30*b* and adjacent to the at least one set of slits. As best seen in FIG. 3, the first ski 30-1 defines sets of openings 30*k*, 30*l* between the top end 30*a* and the bottom end 30*b*. In the illustrated embodiment, a set of first openings 30*k* is defined proximate to the first side 30*c* of the first ski 30-1 and extends entirely through the first ski 30-1 between the inner surface 30*e* and the outer surface 30*f*. It should be noted that the inner surface 30*e* and the outer surface 30*f* of first ski 30-1 are in operative communication with one another at each opening of the set of first openings 30*k*. A set of second openings 30*l* is also defined proximate to the second side 30*d* of the first ski 30-1 and extends entirely through the first ski 30-1 between the inner surface 30*e* and the outer surface 30*f*. It should be noted that the inner surface 30*e* and the outer surface 30*f* of first ski 30-1 are in operative communication with one another at each opening of the set of second openings 30*l*.

Figure 8:
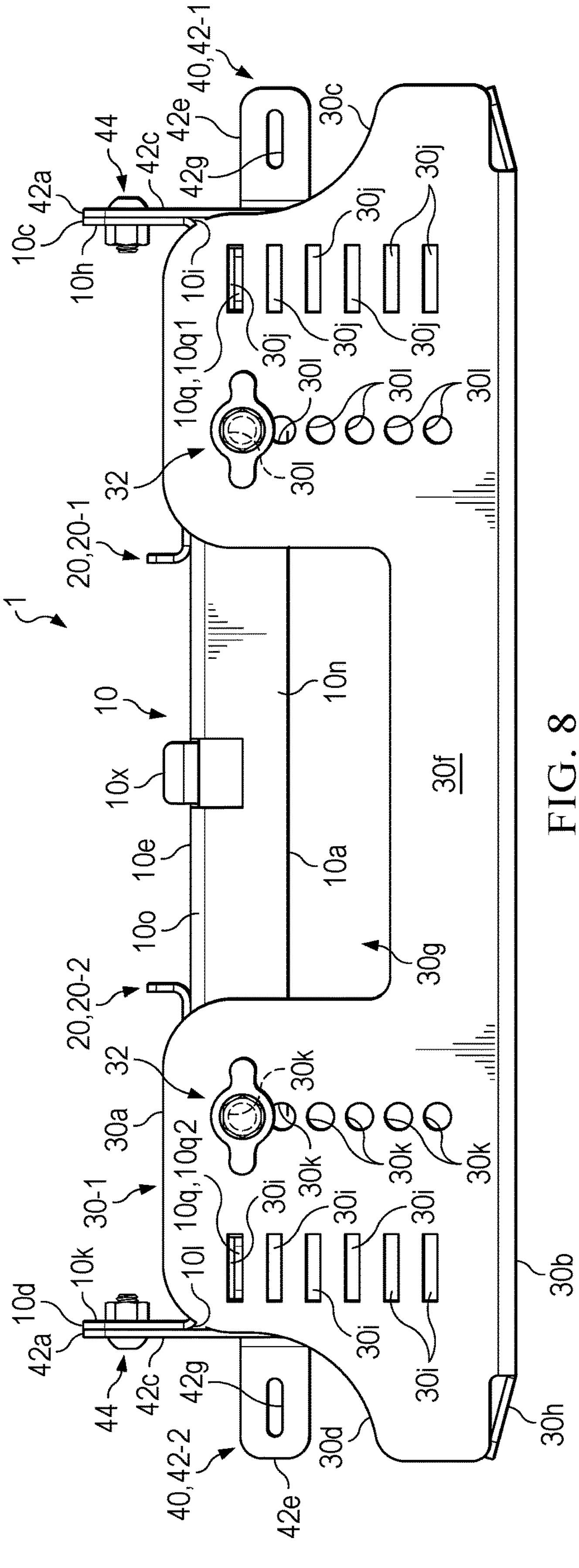
FIG. 8 is a front elevation view of the board mill jig.

In operation, the pair of skis 30-1, 30-2 selectively operably engage with the sled 10 at the first lower rail 10*n* and the second lower rail 10*r* by the first pair of mounts 10*q* and the second pair of mounts 10*u*. As best seen in FIG. 8, the first ski 30-1 selectively operably engages with the sled 10 at the first mounts 10*q*. Particularly, the first mount 10*q* of the first pair of mounts 10*q* passes through a slit of the set of first slits 30*i* of the first ski 30-1 that was predetermined and/or selected by the woodworker. Similarly, the second mount 10*q*2 of the first pair of mounts 10*q* passes through a slit of the set of second slits 30*j* of the first ski 30-1 that was predetermined and/or selected by the woodworker. At this point, the first pair of mounts 10*q* engages with the first ski 30-1 inside of the selected slit of the set of first slits 30*i* and inside of the selected slit of the set of second slits 30*j* to set a desired height of the sled 10 relative to the skid 30*h* of the first ski 30-1 and/or relative to the workpiece. These same actions and engagements are also performed with the second pair of mounts 10*u* of the sled 10 and the second ski 30-2 to set the desired height relative to the skid 30*h* of the second ski 30-2 and/or relative to the workpiece.

It should be noted that the sled 10 may be set at any suitable height based on the engagement between the first lower rail 10*n* and the first ski 30-1 and the between the second lower rail 10*r* and the second ski 30-2. In one exemplary embodiment, the sled 10 may be set at a range of heights between one and one-half inches up to about three and one-half inches measured relative to the skids 30*h* of the pair of skis 30-1, 30-2 based on the engagement between the first lower rail 10*n* and the first ski 30-1 and the between the second lower rail 10*r* and the second ski 30-2. In the same embodiment, the sled 10 may be set at a range of heights between three-quarters of an inch up to about three inches measured relative to a workpiece based on the engagement between the first lower rail 10*n* and the first ski 30-1 and the between the second lower rail 10*r* and the second ski 30-2.

Board mill jig 1 may also include at least one attachment assembly 32 that operably engages the pair of skis 30-1, 30-2 with the sled 10. In the present disclosure, a pair of attachment assemblies 32 operably engages each ski of the pair of skis 30-1, 30-2 with the sled 10. As best seen in FIGS. 2 and 5, each attachment assembly 32 includes a fastener 32*a* that threadably engages with an associated nut 32*b* (see FIG. 6) for releasably attaching each ski of the pair of skis 30-1, 30-2 with the sled 10.

In operation, one of both of the skis of the pair of skis 30-1, 30-2 may be releasably engage with the sled 10 by the pair of securement assemblies 22. Particularly, one or both fasteners 32*a* of the pair of attachment assemblies 32 may be passed through selected openings of the sets of first and second openings 30*k*, 30*l* of the first ski 30-1 and through the set of first securement through-holes 10*p* and secured with the associated nuts 32*b* to releasably attach the first ski 30-1 with the sled 10. As best seen in FIG. 8, the selected openings of the sets of first and second openings 30*k*, 30*l* of the first ski 30-1 are aligned with the selected slits of the sets of first and second slits 30*i*, 30*j* based on the locations of the sets of first and second slits 30*i*, 30*j* and the sets of first and second openings 30*k*, 30*l* defined in the first ski 30-1. These same actions and engagements of the sled 10 and the first ski 30-1 are performed on the sled 10 and the second ski 30-2 by use of securement assemblies 22.

It should be understood that that each ski of the pair of skis 30-1, 30-2 may define any suitable number of slits and any suitable number of openings so that the sled 10 may be set at various heights relative to the skids 30*h* of the pair of skis 30-1, 30-2 and/or a workpiece. In one exemplary embodiment, each ski of a pair of skis described and illustrated herein may define one or more sets of slits and one or more sets of openings so that a sled described and illustrated herein may be set at various heights relative to skids of the pair of skis and/or a workpiece. In the present disclosure, each ski of the pair of skis described and illustrated define two sets of slits and two sets of openings so that the sled described and illustrated herein may be set at various heights relative to the skids of the pair of skis and/or a workpiece.

It should also be understood that each ski of the pair of skis 30-1, 30-2 may define any suitable number of slits for each set of slits 30*i*, 30*j* and any suitable number of openings for each sets of openings 30*k*, 30*l* so that the sled 10 may be set at various heights relative to the skids 30*h* of the pair of skis 30-1, 30-2 and/or a workpiece. In one exemplary embodiment, each ski of a pair of skis described and illustrated herein may define one or more slits for each set of slits and one or more openings for each set of openings. In the present disclosure, each ski of the pair of skis 30-1, 30-2 described and illustrated herein defines six slits for each set of slits 30*i*, 30*j* and six openings for each set of openings 30*k*, 30*l*. As discussed previously, each slit of the set of first slits 30*i* is aligned with an opening of the set of first openings 30*k*, and each slit of the set of second slits 30*j* is aligned with an opening of the set of second openings 30*l*.

In the present disclosure, the sled 10, the pair of alignment guides 20-1, 20-2, and the pair of skis 30-1, 30-2 may be coated and/or made of any suitable material for allowing a woodworker to easily slide tools along the sled 10 and the pair of alignment guides 20-1, 20-2 and to easily slide the entire board mill jig 1 along a work table or work surface. In one exemplary embodiment, the sled 10, the pair of alignment guides 20-1, 20-2, and the pair of skis 30-1, 30-2 may be coated with a material that includes an extremely low coefficient of friction that allows a woodworker to easily slide tools (such as a router or similar cutting tool) along the sled 10 and the pair of alignment guides 20-1, 20-2 and to easily slide the entire board mill jig 1 along a work table or work surface. In another exemplary embodiment, the sled 10, the pair of alignment guides 20-1, 20-2, and the pair of skis 30-1, 30-2 may be coated with a power coated carbide material that includes an extremely low coefficient of friction that allows a woodworker to easily slide tools (such as a router or similar cutting tool) along the sled 10 and the pair of alignment guides 20-1, 20-2 and to easily slide the entire board mill jig 1 along a work table or work surface. It should be noted that such coating and/or material included with the sled 10, the pair of alignment guides 20-1, 20-2, and the pair of skis 30-1, 30-2 may increase the durability and wear of the sled 10, the pair of alignment guides 20-1, 20-2, and the pair of skis 30-1, 30-2 when using the board mill jig 1 to cut various types of workpiece.

Board mill jig 1 also includes a fence assembly 40 that operably engages with the sled 10. As best seen in FIG. 1, the fence assembly 40 is spaced apart and/or remote from the pair of alignment guides 20-1, 20-2 and the pair of skis 30-1, 30-2. As discussed in greater detail below, the fence assembly 40 is configured to engage with an outermost end or edge of a workpiece that is non-parallel or orthogonal to the longitudinal axis "X" of the sled 10. The components of the fence assembly 40 are discussed in greater detail below.

The fence assembly 40 includes at least one mounting bracket 42 that operably engages with the sled 10 at the first upper rail 10*h* or the second upper rail 10*k*. In the present disclosure, and as best seen in FIG. 4, the fence assembly 40 includes a pair of mounting brackets 42-1, 42-2 that operably engages with the sled 10 at the first upper rail 10*h* and the second upper rail 10*k*. Particularly, a first mounting bracket 42-1 engages with the sled 10 at at least one attachment through-hole of the set of first attachment through-holes 10*j*, and a second mounting bracket 42-2 engages with the sled 10 at at least one attachment through-hole of the set of second attachment through-holes 10*m*. Such features of each mounting bracket of the pair of mounting brackets 42-1, 42-2 are discussed in greater detail below.

As best seen in FIG. 4, each mounting bracket of the pair of mounting brackets 42-1, 42-2 includes a top end 42*a* that engages with the sled 10, and a bottom end 42*b* opposite to the top end 42*a* and spaced apart from the sled 10. Each mounting bracket of the pair of mounting brackets 42-1, 42-2 also includes a first portion 42*c* that extends between the top end 42*a* to a bend 42*d* defined in each mounting bracket of the pair of mounting brackets 42-1, 42-2, and a second portion 42*e* that extends between the bottom end 42*b* and the bend 42*d*. In the present disclosure, the first portion 42*c* and the second portion 42*e* are offset to one another in which the first portion 42*c* lies in a first plane that is parallel with the first upper rail 10*h* and the second upper rail 10*k*, and the second portion 42*e* lies in a second plane that is parallel with the pair of skis 30-1, 30-2.

Still referring to FIG. 4, each mounting bracket of the pair of mounting brackets 42-1, 42-2 defines at least one mounting opening 42*f* defined in the first portion 42*c*. Particularly, each mounting bracket of the pair of mounting brackets 42-1, 42-2 defines a pair of mounting openings 42*f* in the first portion 42*c*; such use and purpose of the pair of mounting openings 42*f* is discussed in greater detail below. Each mounting bracket of the pair of mounting brackets 42-1, 42-2 also defines a mounting slot 42*g* in the second portion 42*e*; such use and purpose of the pair of mounting openings 42*f* is discussed in greater detail below.

One or both of the mounting brackets of the pair of mounting brackets 42-1, 42-2 may include indicia to assist the woodworker when assembling the pair of mounting brackets 42-1, 42-2 with the sled 10. In one exemplary embodiment, the first mounting bracket 42-1 may include indicia (such as a letter "L" stamped on the first mounting bracket 42-1) to signify that the first mounting bracket 42-1 is engaged with the left side 10*c* of the sled 10 (i.e., the first upper rail 10*h*). In another exemplary embodiment, the second mounting bracket 42-2 may also include indicia (such as a letter "R" stamped on the second mounting bracket 42-2) to signify that the second mounting bracket 42-2 is engaged with the right side 10*d* of the sled 10 (i.e., the second upper rail 10*k*).

Fence assembly 40 also includes at least one mounting assembly 44 that operably engages the pair of alignment guides 42-1, 42-2 with the sled 10. In the present disclosure, a pair of mounting assemblies 44 operably engages each mounting bracket of the pair of mounting brackets 42-1, 42-2 with the sled 10. As best seen in FIGS. 4 and 5, each mounting assembly 44 includes a fastener 44*a* that threadably engages with an associated nut 44*b* (see FIG. 6) for attaching each mounting bracket of the pair of mounting brackets 42-1, 42-2 with the sled 10.

Fence assembly 40 also includes a sacrificial fence 46 that operably engages with at least one mounting bracket 42-1, 42-2 by a fastener 48. As best seen in FIG. 4, the sacrificial fence 46 operably engages with the pair of mounting brackets 42-1, 42-2 by fasteners 48. As best seen in FIG. 9, the fasteners 48 operably engage the sacrificial fence 46 with the respective mounting bracket of the pair of mounting brackets 42-1, 42-2 at the mounting slots 42*g*. As discussed in greater detail below, the sacrificial fence 46 may be used to guide the board mill jig 1 along an outermost edge of a workpiece that is orthogonal to the uneven surface of the workpiece intended to be flattened and milled by a router.

Such structural configuration of the board mill jig 1 is considered advantageous at least because the board mill jig 1 enables the woodworker to set the board mill jig 1 to a desired configuration based on the workpiece that is being flattened and cut, the type of router being used with the board mill jig 1, and other various tool. In one exemplary embodiment, the woodworker may quickly set the board mill jig 1 at multiple heights depending upon the thickness of the workpiece based on the placement of the pair of skis 30-1, 30-2 relative to the sled 10. In another exemplary embodiment, the woodworker may quickly set the board mill jig 1 to receive and guide any type of portable router along the sled 10 based on the placement of the pair of alignment guides 20-1, 20-2 relative to the sled 10. In yet another exemplary embodiment, the woodworker may also guide the board mill jig 1 along an outermost edge of a workpiece when equipping the fence assembly 40 with the sled 10.

An adjustment tool 50 may also be used with the board mill jig 1; the adjustment tool 50 is separate from the sled 10, the pair of alignment guide 20-1, 20-2, the pair of skis 30-1, 30-2, and the fence assembly 40. As discussed in greater detail below, the adjustment tool 50 is configured to be engaged with a router so that a woodworker operating the router may set a desired cutting depth of the router prior to cutting the workpiece. Such components of the adjustment tool 50 are discussed in greater detail below.

Figure 11:
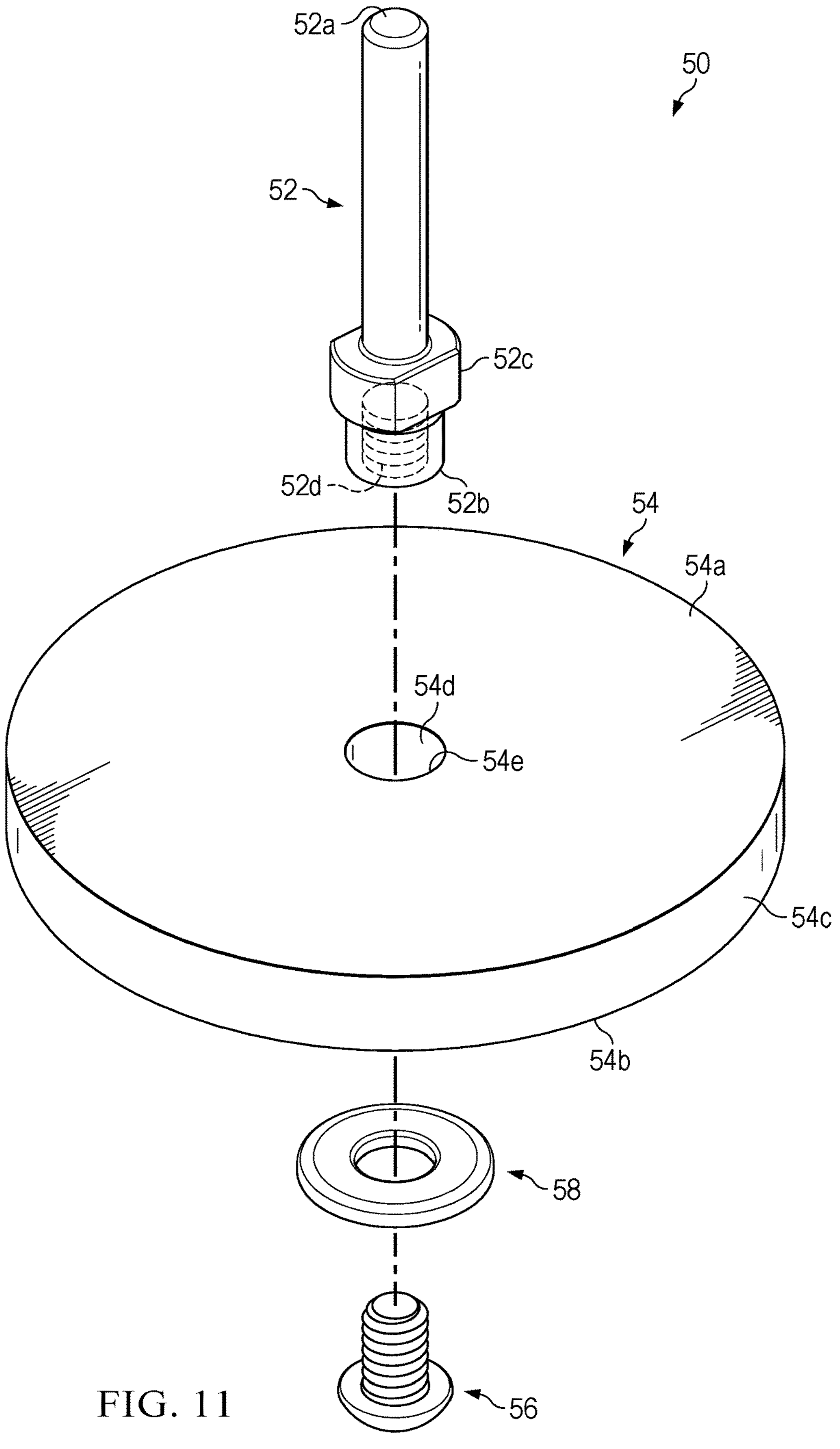
FIG. 11 is an exploded view of the alignment tool shown in FIG. 10.

Adjustment tool 50 includes an arbor 52 that is operably engageable with a router. As best seen in FIG. 11, the arbor 52 includes a first end 52*a*, a second end 52*b* opposite to the first end 52*a*, and a bushing 52*c* that is positioned between the first end 52*a* and the second end 52*b* but is closer to the second end 52*b*. The arbor 52 also defines a threaded passageway 52*d* that extends into the arbor 52 from the second end 52*b* towards the first end 52*a* and the bushing 52*c*; such use and purpose of the threaded passageway 52*d* is discussed in greater detail below.

Adjustment tool 50 also includes a depth disc or ring 54 that operably engages with the arbor 52. As best seen in FIG. 11, depth disc 54 includes a first surface 54*a*, a second surface 54*b* that is opposite to the first surface 54*a*, a peripheral wall 54*c* that extends between the first surface 54*a* and the second surface 54*b*, and a central opening 54*d* defined by an internal wall 54*e* that is spaced apart from the peripheral wall 54*c*. In the present disclosure, the central opening 54*d* extends entirely through the depth disc 54 between the first surface 54*a* and the second surface 54*b* such that the first surface 54*a* and the second surface 54*b* are in operative communication with one another.

Adjustment tool 50 also includes a fastener 56 that operably engages the arbor 52 and the depth disc 54 with one another. In the present disclosure, the fastener 56 threadably engages with the arbor 52 at the threaded passageway 52*d* to engage the depth disc 54 with the arbor 52. Adjustment tool 50 may also include a washer 58 that operably engages with the fastener 56 and the depth disc 54.

Upon assembly of the adjustment tool 50, the first surface 54*a* of the depth disc 54 directly abuts the bushing 52*c* of the arbor 52. Such abutment between the arbor 52 and the depth disc 54 ensures that the depth disc 54 is maintained at a certain location along the arbor 52 during use. Additionally, a portion of the arbor 52 between the second end 52*b* and the bushing 52*c* engages with the internal wall 54*e* of the depth disc 54 inside of the central opening 54*d*.

A set of slab clamping dogs 60 may also be used with board mill jig 1; each slab clamping dog of the set of slab clamping dogs 60 may is separate from the sled 10, the pair of alignment guides 20-1, 20-2, the pair of skis 30-1, 30-2, and the fence assembly 40. As discussed in greater detail below, each slab clamping dog of the set of slab clamping dogs 60 is configured to engage with a clamp and an outermost end or edge of a workpiece to clamp and hold the workpiece at a desired position on the workpiece.

Figure 12:
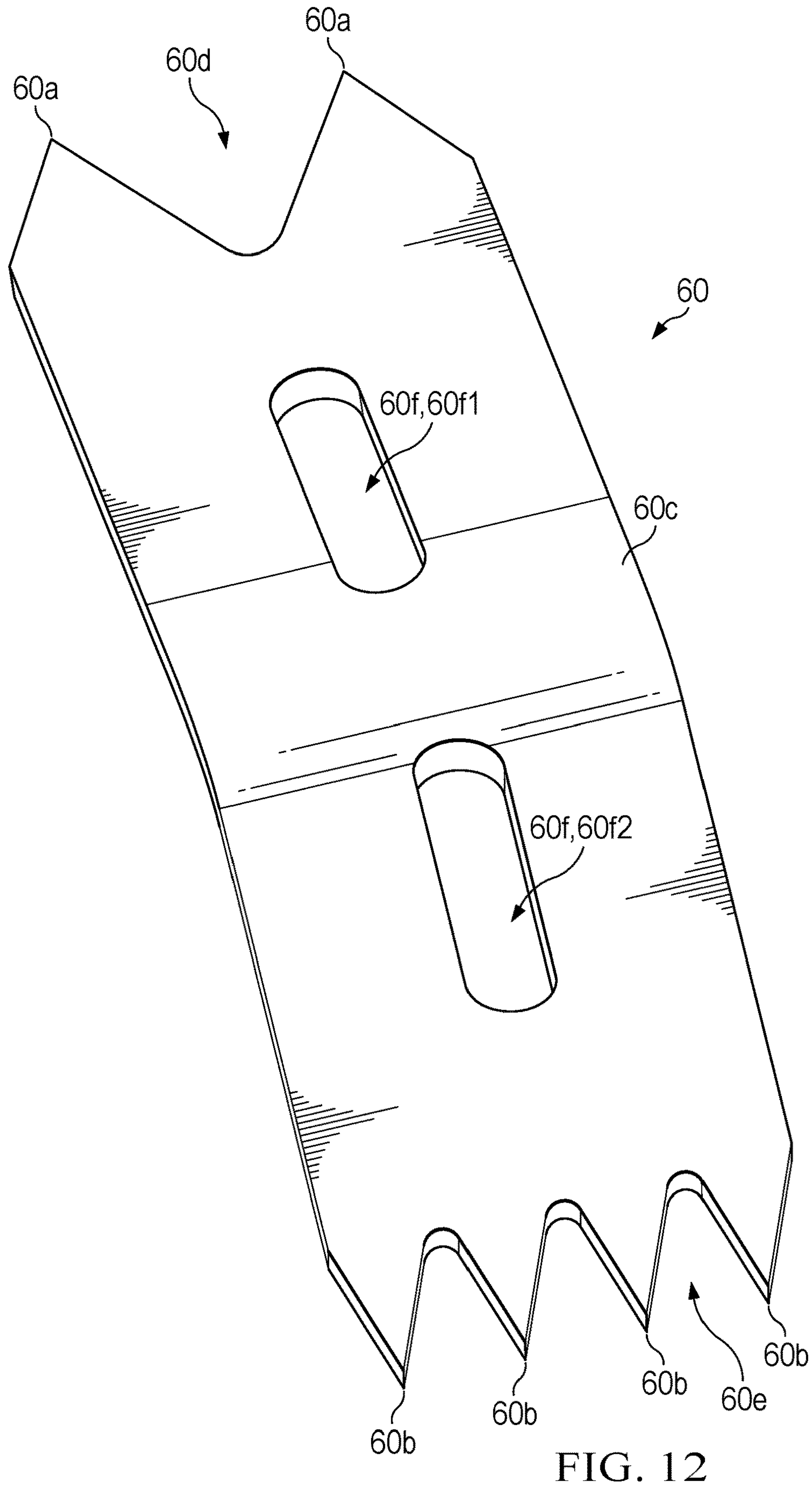
FIG. 12 is a top perspective view of a slab clamping dog.

As best seen in FIG. 12, each slab clamping dog of the set of slab clamping dogs 60 includes a first end 60*a*, a second end 60*b*, and a bend 60*c* that is defined between the first end 60*a* and the second end 60*b*. It should be noted that bend 60*c* is offset from the first end 60*a* and the second end 60*b* in which the first end 60*a* and the second end 60*b* are set at a downward angle when viewed from a top perspective view (see FIG. 12). Each slab clamping dog of the set of slab clamping dogs 60 also defines a first cavity 60*d* at the first end 60*a* in which the first end 60*a* defines two engagement points or teeth. Similarly, each slab clamping dog of the set of slab clamping dogs 60 also defines a set of second cavities 60*e* at the second end 60*b* in which the second end 60*b* defines four engagement points or teeth. Such inclusion of the first cavity 60*d* and the set of second cavities 60*e* is considered advantageous at least because each slab clamping dog of the set of slab clamping dogs 60 provides two different clamping styles or configurations at the first end 60*a* and the second end 60*b*. In one instance, a woodworker may desire to use the first end 60*a* if a workpiece defines a first thickness or a first length that requires a minimal amount of securement. In another instance, a woodworker may desire to use the second end 60*b* if a workpiece defines a second thickness or a second length (which is less than the first thickness or first length described above) that does require a greater amount of securement as compared to the first end 60*a*.

Still referring to the set of slab clamping dogs 60, each slab clamping dog of the set of slab clamping dogs 60 also defines at least one clamp opening 60*f*. As best seen in FIG. 12, each slab clamping dog of the set of slab clamping dogs 60 defines a first clamp opening 60*f*1 that is defined between the first end 60*a* and the bend 60*c*. In operation, the first clamp opening 60*f*1 of the slab clamping dog 60 is configured to receive a clamp so that the first end 60*a* of the slab clamping dog 60 may engage with and clamp to an outermost end of a workpiece. Similarly, each slab clamping dog of the set of slab clamping dogs 60 also defines a second clamp opening 60*f*2 that is defined between the second end 60*b* and the bend 60*c*. In operation, the second clamp opening 60*f*2 of the slab clamping dog 60 is also configured to receive a clamp so that the second end 60*b* of the slab clamping dog 60 may engage with and clamp to an outermost end of a workpiece. It should be understood that a woodworker may clamp one or more slab clamping dogs 60 at the first clamp openings 60*f*1 or the second clamp openings 60*f*2 based on the size, shape, and configuration of the workpiece that needs to be held by the slab clamping dogs 60.

Having now discussed components and features of the board mill jig 1, a method of using the board mill jig 1 to flatten and cut an uneven surface a workpiece with a portable router is discussed in greater detail below.

Figure 13:
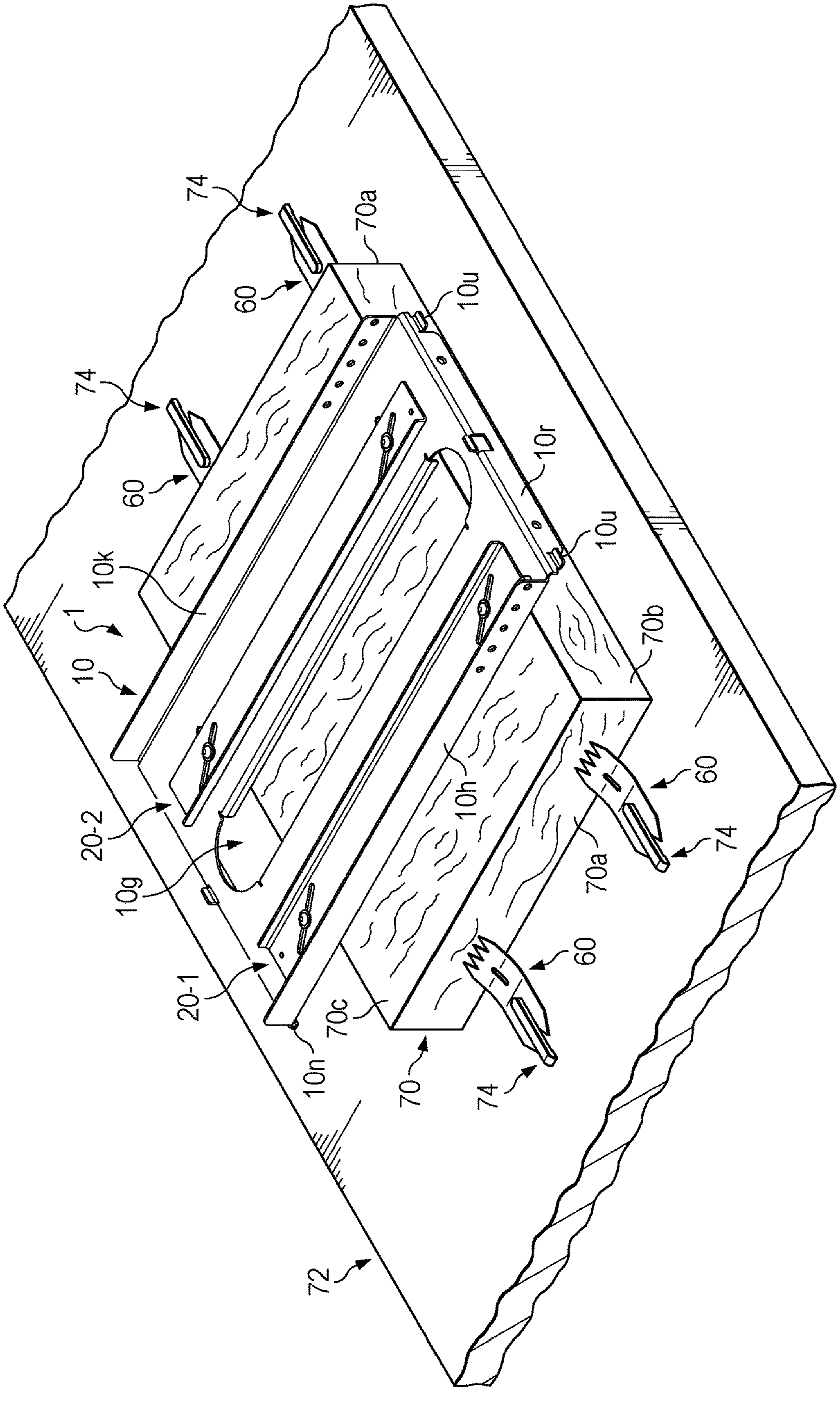
FIG. 13 is an operational view of the sled and the pair of alignment guides resting on a workpiece, wherein the workpiece is clamped to a work table with slab clamping dogs.

Prior to introducing the board mill jig 1 and a router to a workpiece 70, the workpiece 70 is held to a work table 72 by a set of clamps 74 and the set of slab clamping dogs 60 set by the woodworker. Particularly, and as best seen in FIG. 13, outermost sides 70*a* of the workpiece 70 are engaged with at least one slab clamping dog of the set of slab clamping dogs 60 and at least one clamp of the set of clamps 74 while outermost ends 70*b* are free from being engaged. It should be noted that the outermost ends 70*b* of the workpiece 70 are free from being engaged with the set of slab clamping dogs 60 because the fence assembly 40 of the board mill jig 1 may engage one of the outermost sides 70*a* of the workpiece 70, which is discussed is greater detail below.

Once the workpiece 70 is engaged with the work table 72, the woodworker may then introduce the sled 10 and the pair of alignment guides 20 to the workpiece 70. As best seen in FIG. 13, the bottom surface 10*f* of sled 10 may rest on an uneven and/or non-cut surface 70*c* of the workpiece 70 prior to the remaining components of the board mill jig 1 being assembled with the sled 10. At this stage, the pairs of securement assemblies 22 may be loosened from the sled 10 and the pair of alignment guides 20-1, 20-2 such that the pair of alignment guides 20-1, 20-2 are freely moveable along the top surface 10*e* of the sled 10 while still being engaged with the sled 10.

Figure 14:
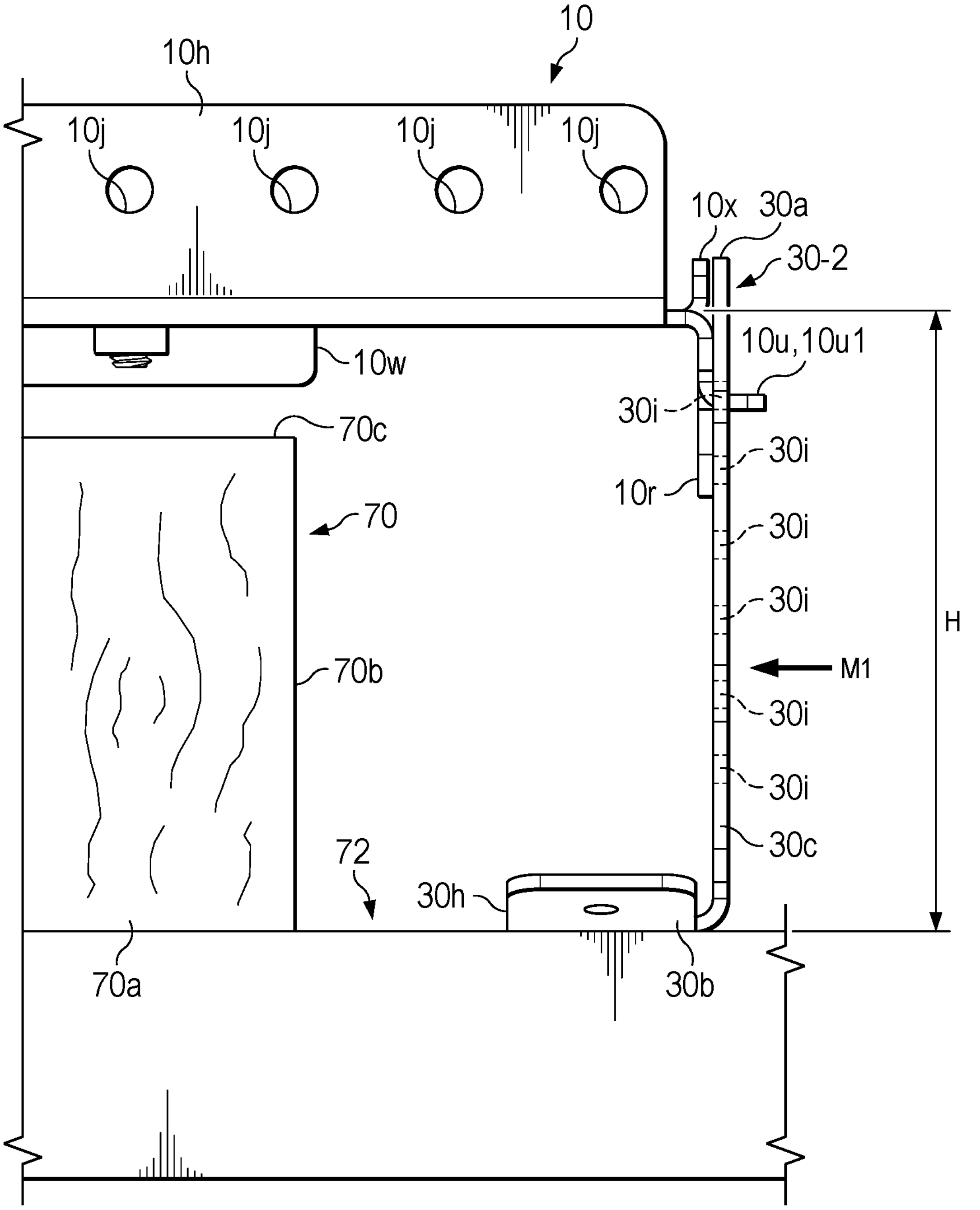
FIG. 14 is another operational view that continues from FIG. 13, wherein a first ski of the pair of skis is engaged with the sled.

The woodworker may then introduce the pair of skis 30-1, 30-2 to the sled 10 to set a desired height of the sled 10. Prior to engage the pair of skis 30-1, 30-2 with the sled 10, the woodworker may elevate the sled 10 above the non-cut surface 70*c* of the workpiece 70 to set a desired height with the pair of skis 30-1, 30-2 measured relative to the skids 30*h* of the pair of skis 30-1, 30-2. At this point, the woodworker then selects desired slits of the set of first slits 30*i* and the set of second slits 30*j* at which the sled 10 is elevated above the non-cut surface 70*c* at the desired height measured relative to the skids 30*h* of the first ski 30-1; such height in denoted by double arrows labeled "H" in FIG. 14. It should be noted that the selected slits of the first slits 30*i* and the set of second slits 30*j* are slits that are aligned along a common axis so that the sled 10 is free from being tilted and/or sloped at an angle measured relative to the transverse axis "Y" of sled 10. Once the slits of the set of first slits 30*i* and set of second slits 30*j* are selected, the first ski 30-1 of the pair of skis 30-1, 30-2 operably engages with the first pair of mounts 10*q* of the sled 10 inside of the selected slits of the set of first slits 30*i* and set of second slits 30*j*; such engagement of the first ski 30-1 with the sled 10 is denoted by an arrow labeled "M1" in FIG. 14. While not illustrated herein, the same step may be performed on the second ski 30-2 of the pair of skis 30-1, 30-2 to operably engage the second ski 30-2 with the second pair of mounts 10*u* of the sled 10 at the same desired height "H" held by the first ski 30-1.

Figure 15:
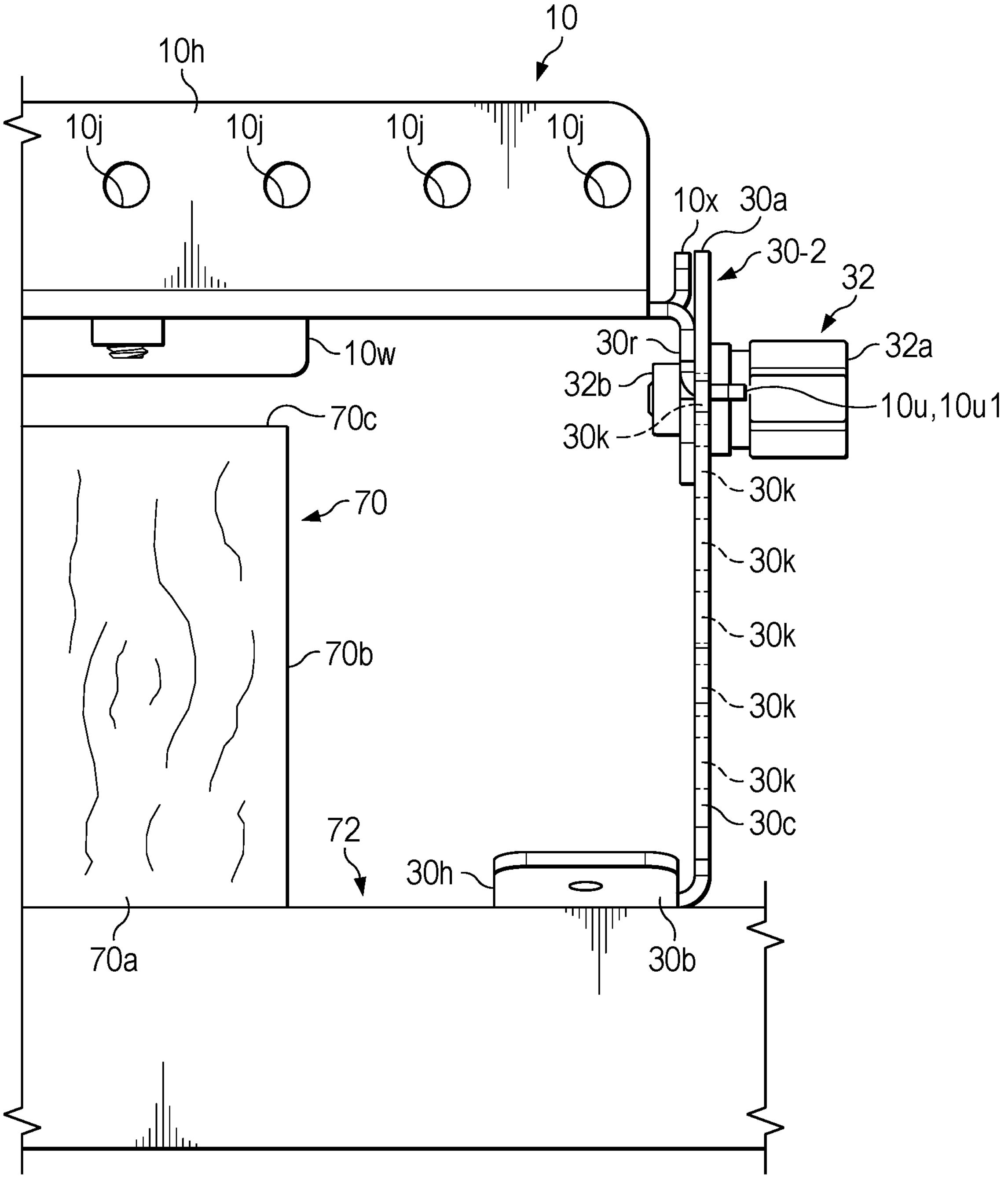
FIG. 15 is another operational view that continues from FIG. 14, wherein attachment assemblies releasably engage the first ski with the sled.

Once the sled 10 and the pair of skis 30-1, 30-2 are engaged, the pairs of attachment assemblies 32 may then releasably engage the pairs of skis 30-1, 30-2 with the sled 10. As best seen in FIG. 15, a first pair of attachment assemblies of the pairs of attachment assemblies 32 releasably engages the first ski 30-1 with the sled 10 at the desired height. Particularly, the fasteners 32*a* of the first pair of attachment assemblies 32 pass through the first ski 30-1 at selected opening of the set of first openings 30*k* and the set of second openings 30*l* and through the sled 10 at the set of first securement through-holes 10*p*. It should be noted that the selected openings of the set of first openings 30*k* and the set of second openings 30*l* are aligned on the same common axis as the selected slits of the set of first slits 30*i* and the set of second slits 30*j*. Once the fasteners 32*a* engage with the sled 10 and the first ski 30-1, the fasteners 32*a* threadably engage with the nuts 32*b* to releasably engage the first ski 30-1 with the sled 10 at the desired height. While not illustrated herein, the same step may be performed on the second ski 30-2 of the pair of skis 30-1, 30-2 to releasably engage the second ski 30-2 with the sled 10 the set of second securement through-holes 10*t* by a second pair of attachment assemblies of the pairs of attachment assemblies 32 at the desired height.

Figure 16:
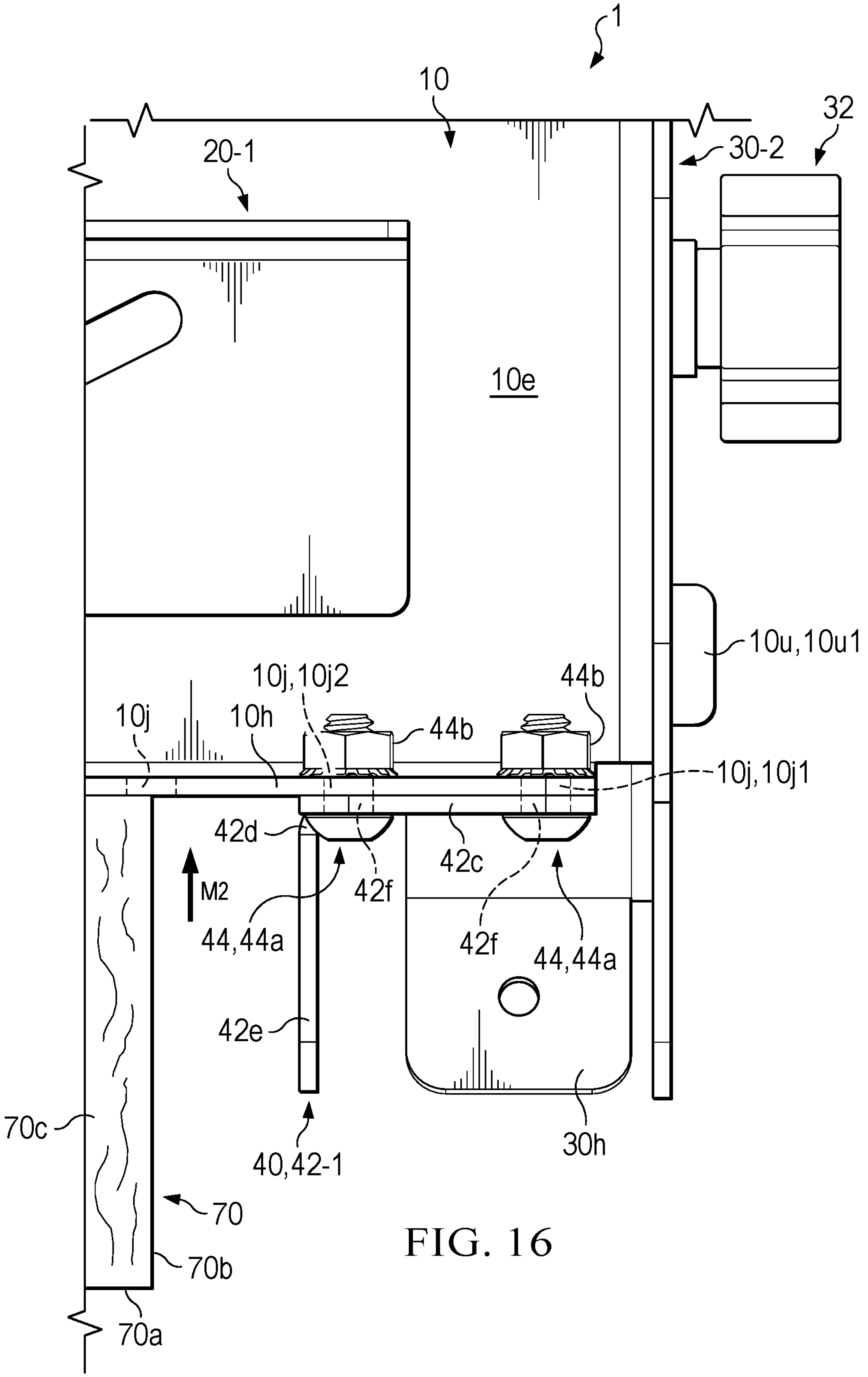
FIG. 16 is another operational view that continues from FIG. 15, wherein a pair of mounting brackets of the fence assembly releasably engages with the sled.

Once the desired height of the board mill jig 1 is set, woodworker may then engage the fence assembly 40 to the sled 10. Prior to attaching the mounting brackets 42-1, 42-2 with the sled 10, the woodworker may select desired attachment through-holes of the first set attachment through-holes 10*j* and the set of second attachment through-holes 10*m* at which the mounting brackets 42-1, 42-2 are attached to the sled 10 based on the width of the workpiece 70. Once the attachment through-holes of the first set attachment through-holes 10*j* and the set of second attachment through-holes 10*m* are selected, the mounting openings 42*f* of the mounting brackets 42-1, 42-2 align with the selected attachment through-holes of the first set attachment through-holes 10*j* and the set of second attachment through-holes 10*m* upon introduction of the mounting brackets 42-1, 42-2; such introduction of at least the first mounting bracket 42-1 is denoted by an arrow labeled "M2" in FIG. 16. Once aligned, fasteners 44*a* of the mounting assemblies 44 pass through the mounting openings 42*f* of the mounting brackets 42-1, 42-2 and pass through the selected attachment through-holes of the first set attachment through-holes 10*j* and the set of second attachment through-holes 10*m* of the sled 10 to engage the mounting brackets 42-1, 42-2 with the sled 10. Once engaged with the sled 10 and the mounting brackets 42-1, 42-2, the fasteners 44*a* are then threadably engaged with the nuts 44*b*.

Figure 17:
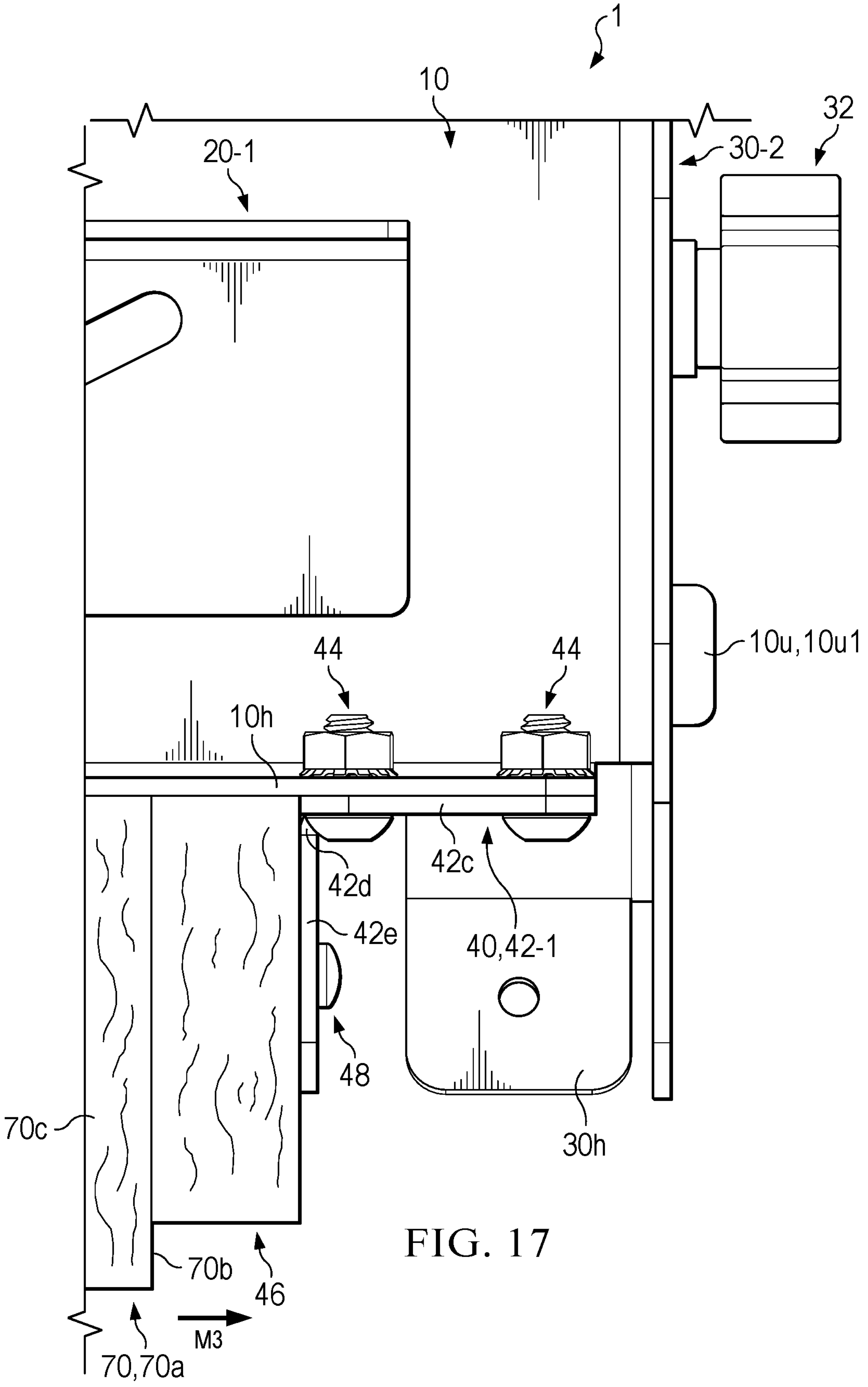
FIG. 17 is another operational view that continues from FIG. 16, wherein a sacrificial fence of the fence assembly releasably engages with the pair of mounting brackets.
Figure 18:
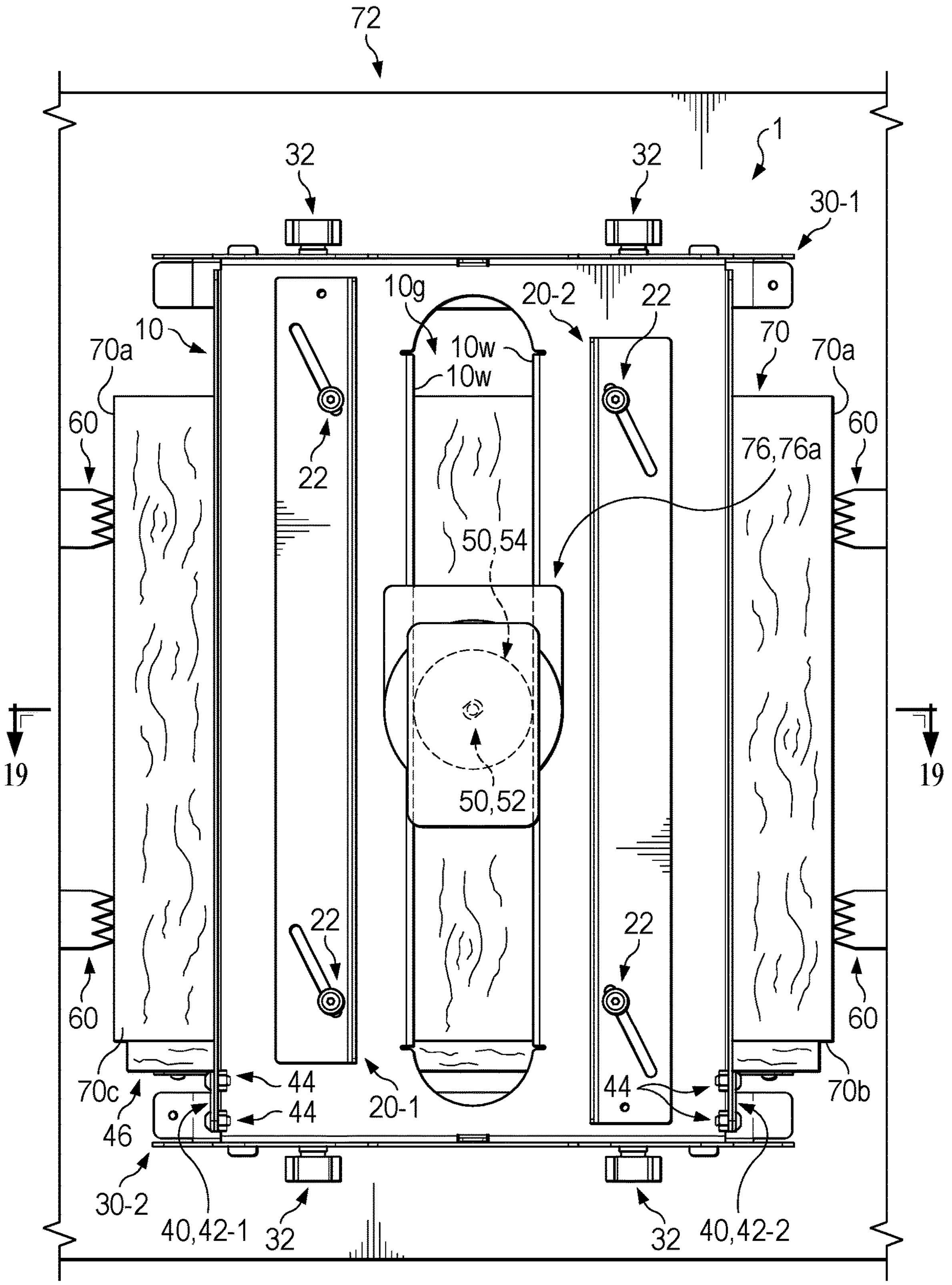
FIG. 18 is another operational view that continues from FIG. 17, wherein a router is introduced to the board mill jig and is equipped with the adjustment tool.

Once the mounting brackets 42-1, 42-2 are engaged with the sled 10, the sacrificial fence 46 is then engaged with the mounting brackets 42-1, 42-2 by the fasteners 48 (see FIG. 17); such engagement of the sacrificial fence 46 with the mounting brackets 42-1, 42-2 is denoted by an arrow labeled "M3" in FIG. 17. Upon such engagement of the sacrificial fence 46, the sacrificial fence 46 may then abut one of the outermost ends 70*b* of the workpiece 70 so that the board mill jig 1 may glide along the workpiece 70 as a router is cutting and flattening the non-cut surface 70*c* of the workpiece 70.

Figure 19:
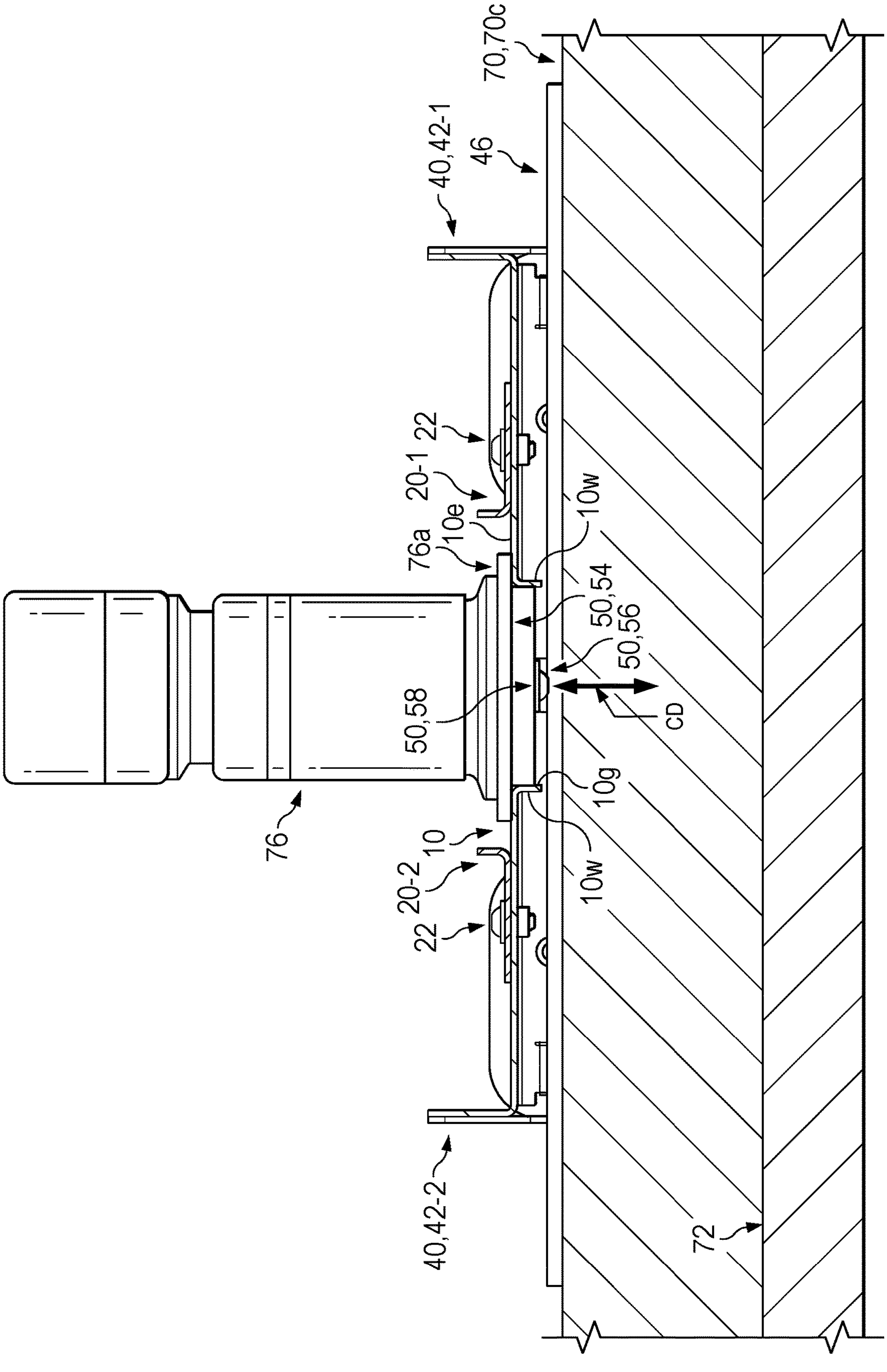
FIG. 19 is another operational view that continues from FIG. 18 and is taken in the direction of line 19-19 in FIG. 18, wherein the adjustment tool is adjusted by the router to set a desired cutting height of the router.

Once the board mill jig 1 is installed with the workpiece 70 at the desired height, the woodworker may then introduce a router 76 to the sled 10 of the board mill jig 1 to set a desired cutting height relative to the sled 10 and/or the fence assembly 40 by the adjustment tool 50. Prior to introducing the router 76, the arbor 52 of the adjustment tool 50 is engaged with a collet (not illustrated) of the router 76 to set the desired cutting height of the router 76. In this operation, the bushing 52*c* of the arbor 52 is positioned below a base 76*a* of the router when installing the adjustment tool 50. Once engaged, the woodworker adjusts the cutting depth of the router 76 until the depth disc 54 is abutting the base 76*a* of the router 76; such adjustment of the depth is denoted by a double arrow labeled "CD" in FIG. 19. Once the cutting depth is set, the woodworker may remove the adjustment tool 50 from the router 76 and may install a router bit 76*b* with the router 76 for cutting and flattening the non-cut surface 70*c* of the workpiece 70.

Figure 20:
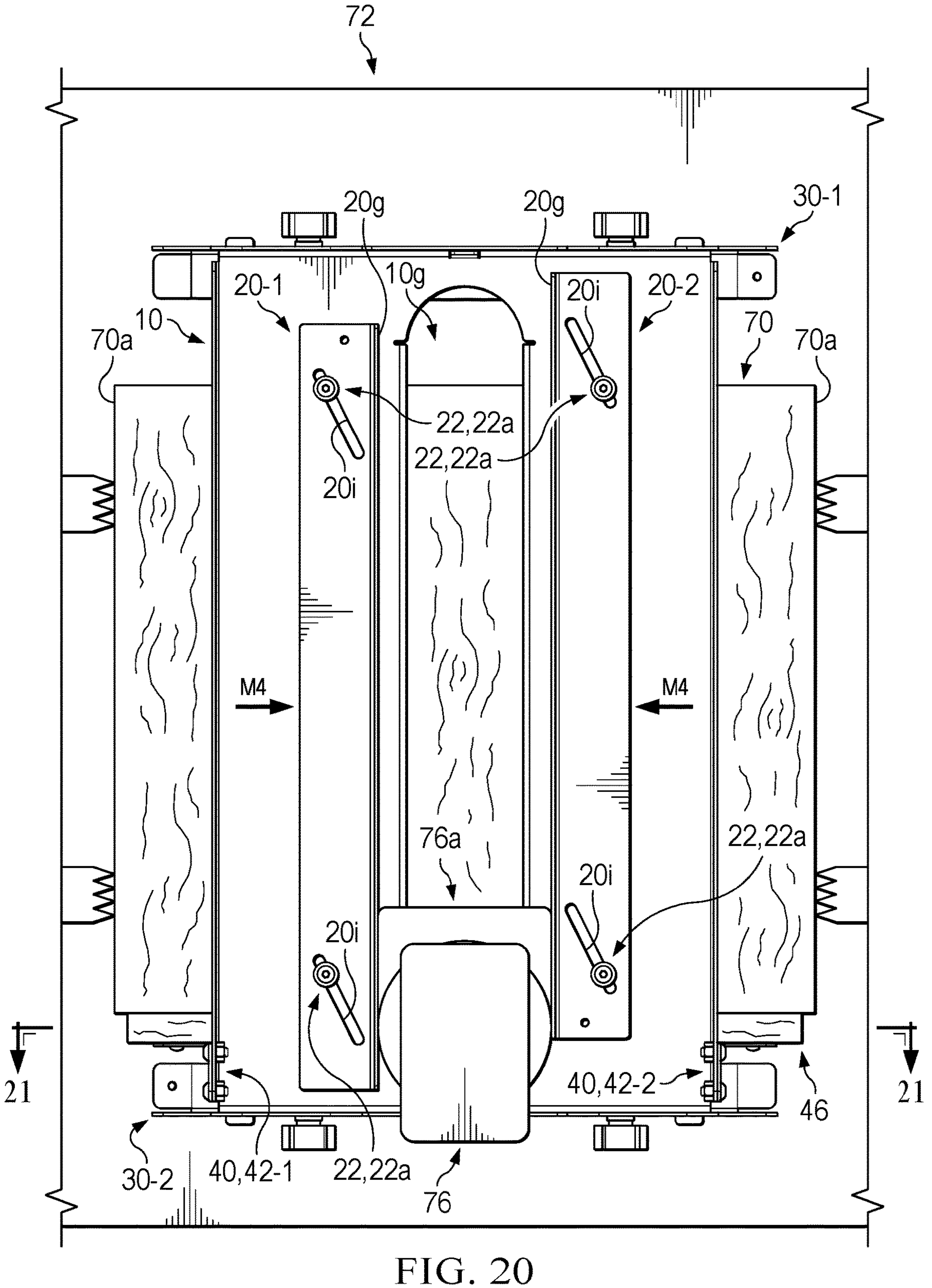
FIG. 20 is another operational view that continues from FIG. 19, wherein the pair of alignment guides are moved from a stored position to an engaged position to guide the router.

While the router 76 is still resting on the sled 10, the woodworker may also move one or both of the alignment guides 20-1, 20-2 until the alignment guides 20-1, 20-2 are abutting the base 76*a* of the router 76. As best seen in FIG. 20, woodworker moves one or both of the alignment guides 20-1, 20-2 from a stored position (see FIG. 13) to an engaged position (see FIG. 20) along the top surface 10*e* of the sled 10 relative to the channel 10*g* until one or both of the alignment guides 20-1, 20-2 are abutting the base 76*a* of the router 76. Such movement of the alignment guide 20-1, 20-2 is denoted by arrows labeled "M4" in FIGS. 20-21. It should be noted that the alignment guides 20-1, 20-2 also ride along the securement assemblies 22 inside of the slots 20*i* as the woodworker moves one or both of the alignment guides 20-1, 20-2 are moved along the top surface 10*e* of the sled 10 relative to the channel 10*g*. Once the alignment guides 20-1, 20-2 are abutting the base 76*a* of the router 76, the fasteners 22*a* of the securement assemblies 22 are tightened to the nuts 22*b* to releasably engage the alignment guides 20-1, 20-2 at this engaged position. If desired, the woodworker may slide the router 76 along the sled 10 to ensure that the router 76 is not impeded from moving along the entire length of the sled 10 by the alignment guides 20-1, 20-2.

Figure 21:
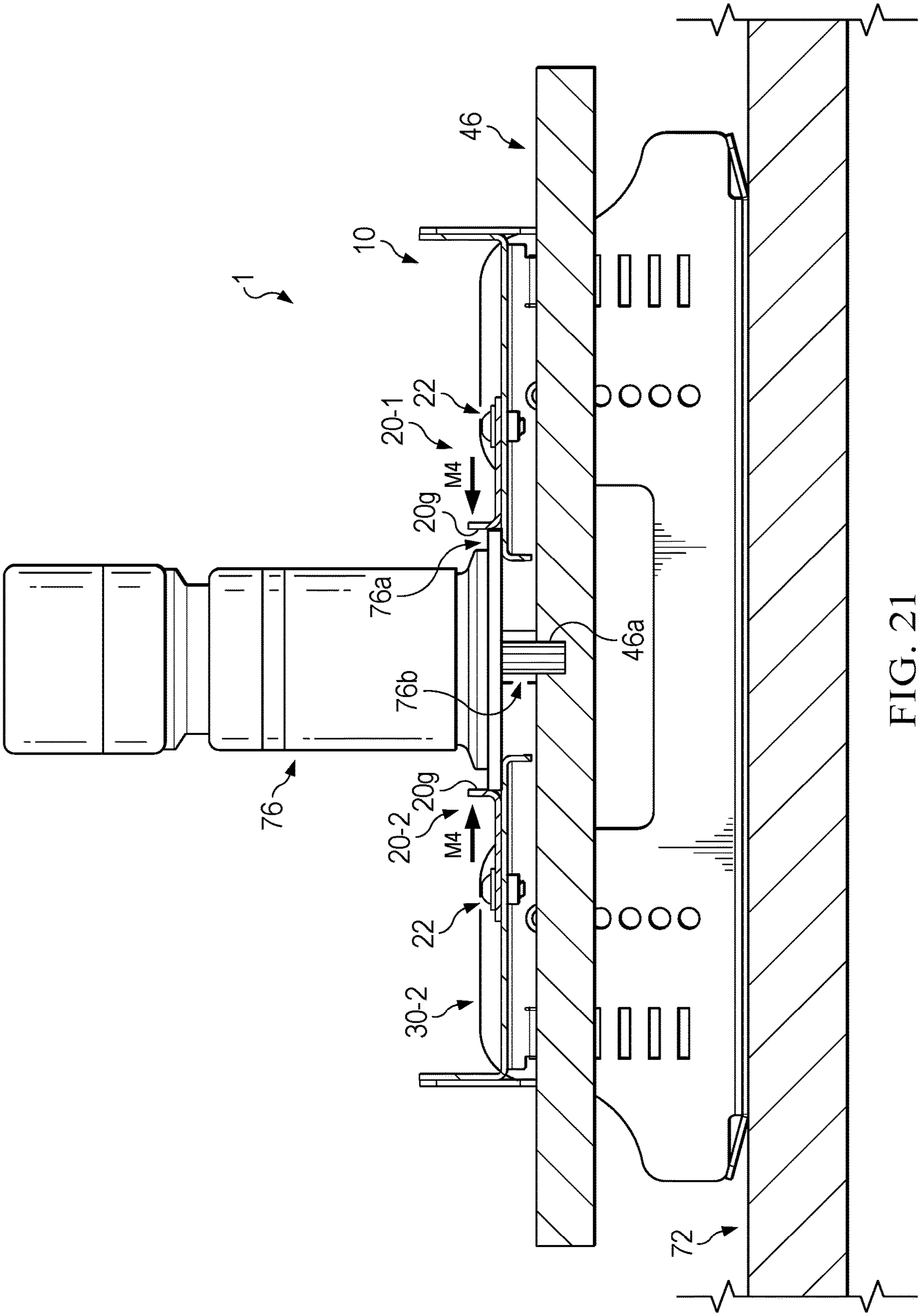
FIG. 21 is another operational view that continues from FIG. 20, wherein the router cuts into the sacrificial fence to confirm the cutting depth of the router.
Figure 22:
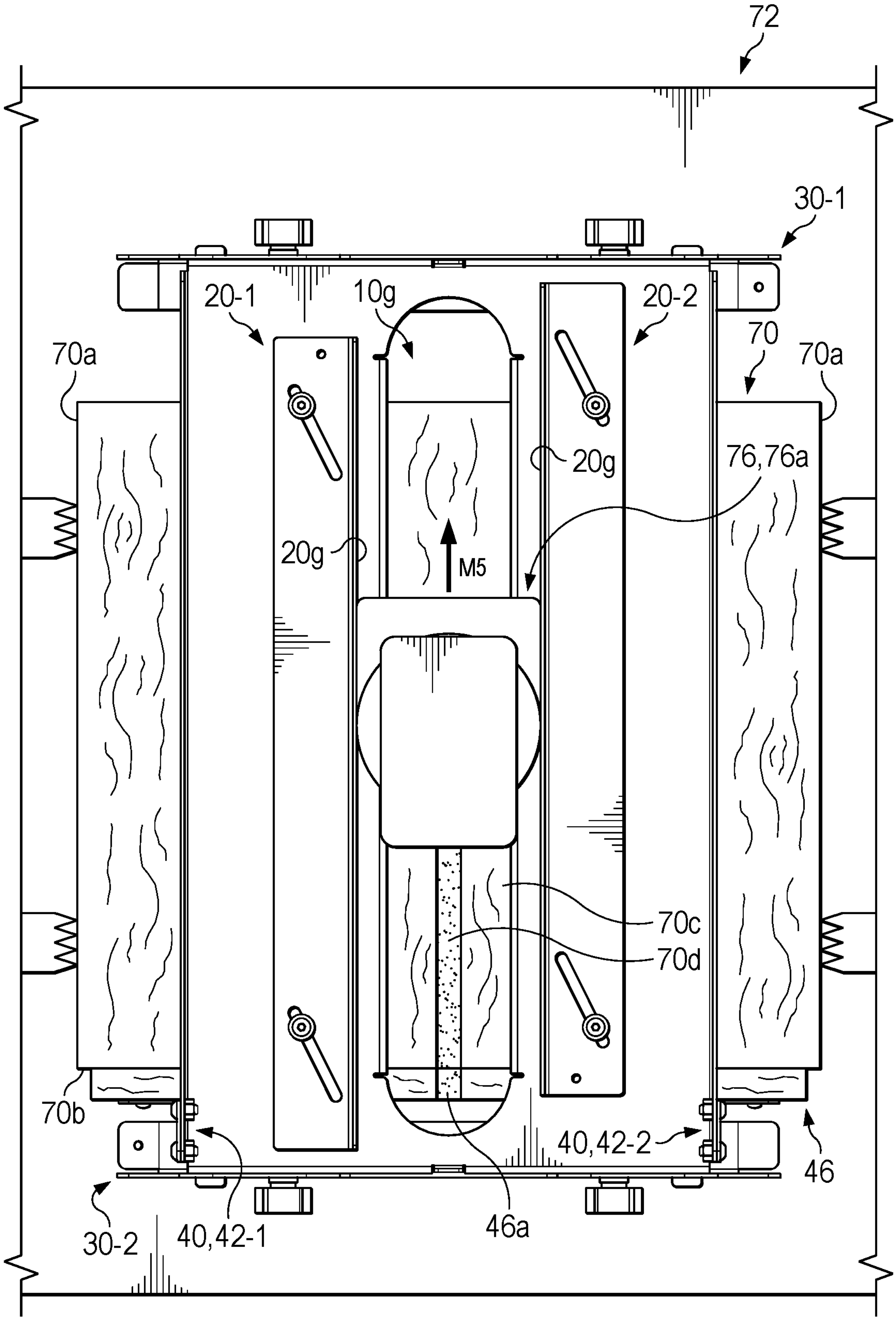
FIG. 22 is another operational view that continues from FIG. 21, wherein the router is guided along the sled by the pair of alignment guides to cut along the non-even surface of the workpiece and to create a flat surface along the workpiece.

Once the alignment guides 20-1, 20-2 are set, the woodworker may begin cutting and flattening the workpiece 70. Prior to cutting, the woodworker may cut into the sacrificial fence 46 to determine the cutting depth is correct prior to cutting into the non-cut surface 70*c* of the workpiece 70. As best seen in FIG. 21, a notch 46*a* is cut into the sacrificial fence 46 by the router bit 76*b* of the router 76 to signify the depth at which the router 76 will be cutting into the workpiece 70. If the depth of the notch 46*a* defined in the sacrificial fence 46 is suitable, the woodworker may then proceed to cut into the non-cut surface 70*c* of the workpiece 70 to create a cut or finished surface 70*d* along the workpiece 70 in a direction controlled by the pair of alignment guides 20-1, 20-2 (see FIG. 22); such movement of the router 76 along the sled 10 is denoted by an arrow labeled "M5" in FIG. 22. It should be noted that the router 76 may travel in any direction along the longitudinal axis "X" of sled 10 between the front end 10*a* of the sled 10 and the rear end 10*b* of the sled 10 when cutting the workpiece 70.

Figure 23:
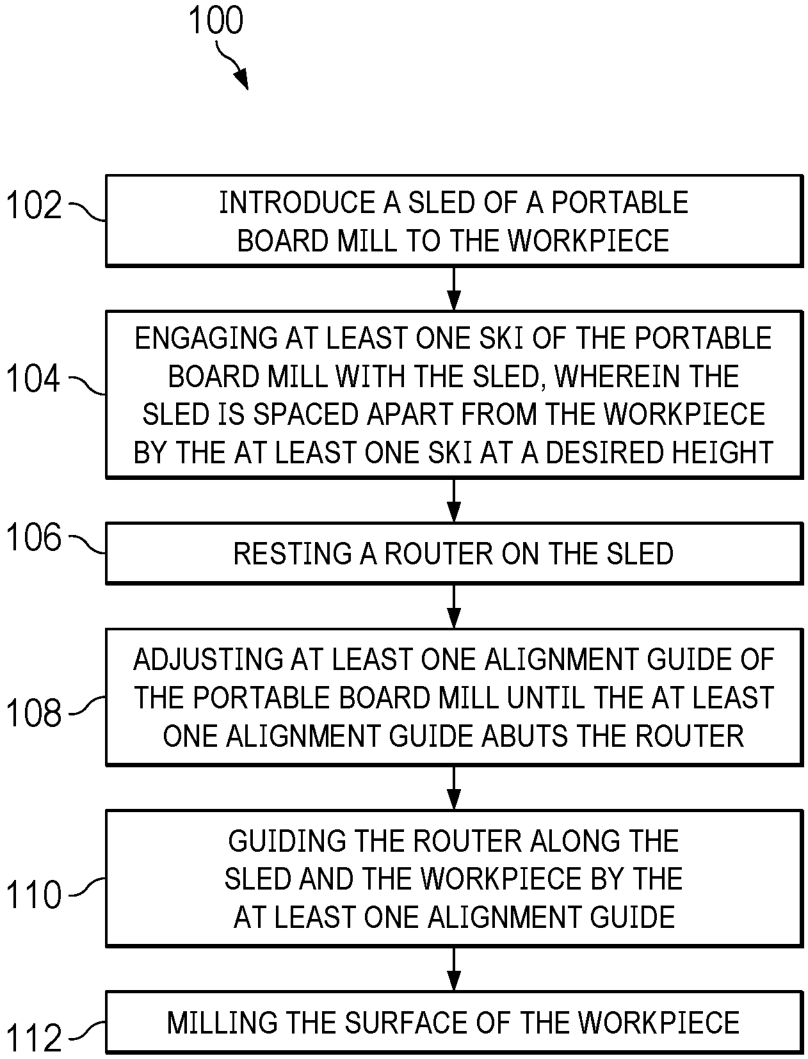
FIG. 23 is an exemplary method flowchart

FIG. 23 illustrates a method 100 of milling a surface of a workpiece. An initial step 102 of method 100 includes introducing a sled of a portable board mill to the workpiece. Another step 104 of method 100 includes engaging at least one ski of the portable board mill with the sled, wherein the sled is spaced apart from the workpiece by the at least one ski at a desired height. Another step 106 of method 100 includes resting a router on the sled. Another step 108 of method 100 includes adjusting at least one alignment guide of the portable board mill until the at least one alignment guide abuts the router. Another step 110 of method 100 includes guiding the router along the sled and the workpiece by the at least one alignment guide. Another step 112 of method includes milling the surface of the workpiece.

In other exemplary embodiments, method 100 may include optional and/or additional steps of milling a surface of a workpiece. In one exemplary embodiment, method 100 may further include steps of: engaging a fence assembly of the portable board mill with the sled; engaging an outermost end of the workpiece with the fence assembly; and guiding the portable board mill along the outermost end of the workpiece by the fence assembly. In another exemplary embodiment, method 100 may further include that the step of engaging the at least one ski of the portable board mill with the sled further comprises: selecting a slit from at least one set of slits defined in the at least one ski; engaging a mount of the sled with the at least one ski at the selected slit of the at least one ski; and maintaining the sled at the desired height, by the at least one ski, above the workpiece. In another exemplary embodiment, method 100 may further include that the step of adjusting the at least one alignment guide of the portable board mill further comprises: selecting between a first attachment aperture defined in the sled and a second attachment aperture defined in the sled; and engaging the at least one alignment guide with the sled, by a securement assembly, at the first attachment aperture or the second attachment aperture. In another exemplary embodiment, method 100 may further include that the step of engaging the fence assembly with the sled further comprises: selecting an attachment through-hole of a set of attachment through-holes defined by the sled; engaging a mounting bracket of the fence assembly with the sled at the selected through-hole; engaging a sacrificial fence of the fence assembly to the mounting bracket; and contacting the sacrificial fence with the outermost end of the workpiece. In another exemplary embodiment, method 100 may further include that the step of engaging the at least one ski of the portable board mill with the sled further comprises: engaging at least one ski of the portable board mill with the sled, wherein the sled is spaced apart from the workpiece by the at least one ski and the at least another ski at the desired height. In another exemplary embodiment, method 100 may further include steps of engaging an alignment tool of the portable board mill with a router; and adjusting the alignment tool, by the router, until a base of the router touches a depth disc of the alignment tool.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of," or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to “an embodiment,” “one embodiment,” “some embodiments,” “one particular embodiment,” “an exemplary embodiment,” or “other embodiments,” or the like, means that a particular feature, structure, or characteristic described in connection with the embodiments is included in at least some embodiments, but not necessarily all embodiments, of the invention. The various appearances “an embodiment,” “one embodiment,” “some embodiments,” “one particular embodiment,” “an exemplary embodiment,” or “other embodiments,” or the like, are not necessarily all referring to the same embodiments.

If this specification states a component, feature, structure, or characteristic “may”, “might”, or “could” be included, that particular component, feature, structure, or characteristic is not required to be included. If the specification or claim refers to “a” or “an” element, that does not mean there is only one of the element. If the specification or claims refer to “an additional” element, that does not preclude there being more than one of the additional element.

As used herein in the specification and claims, including as used in the examples and unless otherwise expressly specified, all numbers may be read as if prefaced by the word “about” or “approximately,” even if the term does not expressly appear. The phrase “about” or “approximately” may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as “comprising,” “including,” “carrying,” “having,” “containing,” “involving,” “holding,” “composed of,” and the like are to be understood to be open-ended, i.e., to mean including but not limited to. Only the transitional phrases “consisting of” and “consisting essentially of” shall be closed or semi-closed transitional phrases, respectively.

To the extent that the present disclosure has utilized the term “invention” in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A portable board mill, comprising:

a sled having a first end, a second end opposite to the first end, and a longitudinal axis defined between the first end and the second end, wherein the sled is adapted to engage with a router;

at least one ski selectively operably engagable with the sled at one of the first end and the second end, wherein the at least one ski is adapted to engage with a work surface;

at least one alignment guide operably engaged with the sled and moveable between the first end and the second end at least one mount of the sled positioned at one of the first end and the second end; and a set of slits defined in the at least one ski; wherein the at least one mount operably engages with the at least one ski inside a selected slit of the set of slits.

2. The portable board mill of claim 1, further comprising:

a fence assembly operably engaged with the sled at one of the first end of the sled and the second end of the sled;

wherein the fence assembly is adapted to engage with an outermost end of a workpiece.

3. The portable board mill of claim 1, wherein the sled further comprises:

a first surface extending between the first end and the second end;

a second surface extending between the first end and the second end and is opposite to the first surface; and a channel defined between the first end of the sled and the second end of the sled; wherein the first surface and the second surface are in operative communication with one another at the channel so that a portion of a router bit of the router is received inside of the channel;

wherein the at least one alignment guide is moveable along the first surface relative to the channel.

4. The portable board mill of claim 1, wherein the at least one ski further comprises:

a top end;

a bottom end opposite to the top end;

a first slit of the set of slits defined in the at least one ski at a first distance from the bottom end; and a second slit of the set of slits defined in the at least one ski at a second distance from the bottom end that is greater than the first distance;

wherein the at least one mount operably engages with the at least one ski inside the first slit of the set of slits or the second slit of the set of slits.

5. The portable board mill of claim 1, further comprising:

a set of openings defined in the at least one ski; and at least one attachment assembly releasably engaging the at least one ski with the sled at a selected opening of the set of openings.

6. The portable board mill of claim 2, wherein the fence assembly comprises:

a mounting bracket operably engaged with the sled; and a sacrificial fence operably engaged with the mounting bracket and positioned below the sled;

wherein the sacrificial fence engages with the outermost end of the workpiece.

7. The portable board mill of claim 6, wherein the sled further comprises:

a first side defined between the first end and the second end;

a second side defined between the first end and the second end and opposite to the first side; and a set of attachment through-holes defined in one of the first side and the second side;

wherein the fence assembly is engageable with at least one attachment through-hole of the set of attachment through-holes.

8. The portable board mill of claim 7, wherein the sled further comprises:

a first attachment through-hole of the set attachment through-holes defined in the sled at a first distance from the first end; and a second attachment through-hole of the set attachment through-holes defined in the sled at a second distance from the first end that is greater than the first distance.

9. The portable board mill of claim 7, wherein the fence assembly further comprises:

a securement assembly operably engaging the mounting bracket with the sled at an attachment through-hole of the set of attachment through-holes.

10. The portable board mill of claim 3, further comprising:

an attachment aperture defined by the sled;

a slot defined in the at least one alignment guide; and a securement assembly operably engaging the at least one alignment guide with the sled at the attachment aperture;

wherein the at least one alignment guide is moveable between the first end of the sled and the channel along the securement assembly relative to the attachment aperture.

11. The portable board mill of claim 3, further comprising:

a first attachment aperture defined by the sled at a first distance from the channel;

a second attachment aperture defined by the sled at a second distance from the channel, wherein the second distance is less than the first distance;

a slot defined in the at one alignment guide; and a securement assembly operably engaging the at least one alignment guide with the sled at the first attachment aperture or the second attachment aperture;

wherein the at least one alignment guide is moveable between the first end of the sled and the channel along the securement assembly relative to the first attachment aperture or the second attachment aperture.

12. The portable board mill of claim 3, further comprising:

at least another alignment guide operably engaged with the sled and moveable between the first end and the second end;

wherein the at least another alignment guide is positioned opposite to the at least one alignment guide and is moveable relative to the channel.

* * * * *